(12) United States Patent
Vermani et al.

(10) Patent No.: US 11,751,063 B2
(45) Date of Patent: *Sep. 5, 2023

(54) GENERALIZED DISTRIBUTED MULTI-USER (MU) TRANSMISSIONS

(71) Applicant: QUALCOMM Incorporated, San Diego, CA (US)

(72) Inventors: Sameer Vermani, San Diego, CA (US); Bin Tian, San Diego, CA (US); Jialing Li Chen, San Diego, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/928,917

(22) Filed: Jul. 14, 2020

(65) Prior Publication Data

US 2021/0006980 A1 Jan. 7, 2021

Related U.S. Application Data

(63) Continuation of application No. 16/052,474, filed on Aug. 1, 2018, now Pat. No. 10,721,627.

(Continued)

(51) Int. Cl.
*H04W 4/00* (2018.01)
*H04W 16/10* (2009.01)
(Continued)

(52) U.S. Cl.
CPC ............ *H04W 16/10* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS 8,233,462 B2 7/2012 Walton et al.
9,089,002 B2 7/2015 Abraham et al.
(Continued)

FOREIGN PATENT DOCUMENTS

CN 102265668 A 11/2011
CN 105379145 A 3/2016
(Continued)

OTHER PUBLICATIONS

International Search Report and Written Opinion—PCT/US2018/045031—ISA/EPO—dated Nov. 13, 2018.
(Continued)

*Primary Examiner* — Zewdu A Beyen
(74) *Attorney, Agent, or Firm* — Patterson+ Sheridan, L.L.P.

(57) ABSTRACT

Certain aspects relate to methods and apparatus for wireless communication. The apparatus generally includes a processing system configured to generate a first frame including an indication of unused resources in a first basic service set (BSS) available to be shared with one or more wireless nodes in one or more second BSSs. The apparatus also includes a first interface configured to output the first frame for transmission to the one or more wireless nodes.

29 Claims, 21 Drawing Sheets

Related U.S. Application Data

(60) Provisional application No. 62/541,608, filed on Aug. 4, 2017.

(51) Int. Cl.

| | | |
|---|---|---|
| *H04B 7/024* | (2017.01) | |
| *H04B 7/0417* | (2017.01) | |
| *H04B 7/0452* | (2017.01) | |
| *H04B 7/06* | (2006.01) | |
| *H04W 84/10* | (2009.01) | |
| *H04W 72/0446* | (2023.01) | |

(52) U.S. Cl.
CPC ......... *H04B 7/0452* (2013.01); *H04B 7/0617* (2013.01); *H04B 7/0626* (2013.01); *H04W 72/0446* (2013.01); *H04W 84/10* (2013.01)

(56) References Cited

U.S. PATENT DOCUMENTS

| | | | |
|---|---|---|---|
| 2008/0219286 A1* | 9/2008 | Ji | H04L 12/413 |
| | | | 370/465 |
| 2014/0328264 A1 | 11/2014 | Merlin et al. | |
| 2016/0165574 A1* | 6/2016 | Chu | H04W 72/0413 |
| | | | 370/312 |
| 2016/0183161 A1 | 6/2016 | Jeong et al. | |
| 2016/0198500 A1 | 7/2016 | Merlin et al. | |
| 2016/0204912 A1* | 7/2016 | Sun | H04L 1/0042 |
| | | | 375/302 |
| 2017/0063859 A1* | 3/2017 | Shue | H04L 47/14 |
| 2017/0331534 A1 | 11/2017 | Jiang et al. | |
| 2019/0045366 A1 | 2/2019 | Vermani et al. | |
| 2019/0182890 A1* | 6/2019 | Jeong | H04W 72/14 |

FOREIGN PATENT DOCUMENTS

| | | |
|---|---|---|
| EP | 2664195 A2 | 11/2013 |
| EP | 3068173 A1 | 9/2016 |
| WO | 2005039105 A1 | 4/2005 |
| WO | 2011146415 | 11/2011 |
| WO | 2016037056 | 3/2016 |

OTHER PUBLICATIONS

CATT: "Considerations on NIB-CoMP", 3GPP TSG RAN WG3#84, May 23, 2014.

* cited by examiner

GENERALIZED DISTRIBUTED MULTI-USER (MU) TRANSMISSIONS

CROSS-REFERENCE TO RELATED APPLICATIONS

This application is a continuation of U.S. patent application Ser. No. 16/052,474, filed Aug. 1, 2018, which claims the benefit of and priority to U.S. Provisional Patent Application No. 62/541,608, filed Aug. 4, 2017, which are assigned to the assignee hereof and hereby expressly incorporated by reference herein in their entireties.

BACKGROUND

I. Field of the Disclosure

The present disclosure relates generally to communication systems, and more particularly, to methods and apparatus for distributed communications using unused resources shared across multiple basic service sets (BSSs).

II. Description of Related Art

In order to address the issue of increasing bandwidth requirements that are demanded for wireless communication systems, different schemes are being developed to allow multiple user terminals to communicate with a single access point (AP) or multiple APs by sharing the channel resources while achieving high data throughputs. Multiple Input Multiple Output (MIMO) technology represents one such approach that has recently emerged as a popular technique for the next generation communication systems.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (such as higher throughput and greater reliability) if the additional dimensionalities created by the multiple transmit and receive antennas are utilized.

In wireless networks with multiple APs and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

In a distributed MU-MIMO system, multiple APs may simultaneously serve a plurality of spatially separated STAs by coordinating beamforming by the antennas of the multiple APs. For example, multiple APs may coordinate transmissions to each STA.

As the demand for wireless access continues to increase, there exists a desire for further improvements in wireless technology. Preferably, these improvements should be applicable to other multi-access technologies and the communication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communication. The apparatus generally includes a processing system configured to generate a first frame including an indication of unused resources in a first basic service set (BSS) available to be shared with one or more wireless nodes in one or more second BSSs. The apparatus also includes a first interface configured to output the first frame for transmission to the one or more wireless nodes.

Certain aspects of the present disclosure provide a method for wireless communications that may be performed, for example, by an apparatus. The method generally includes generating a first frame including an indication of unused resources in a first basic service set (BSS) available to be shared with one or more wireless nodes in one or more second BSSs. The method also includes outputting the first frame for transmission to the one or more wireless nodes.

Certain aspects of the present disclosure provide an apparatus for wireless communications. The apparatus generally includes means for generating a first frame including an indication of unused resources in a first basic service set (BSS) available to be shared with one or more wireless nodes in one or more second BSSs. The apparatus also includes means for outputting the first frame for transmission to the one or more wireless nodes.

Certain aspects of the present disclosure provide a computer-readable medium having computer executable code stored thereon for wireless communication by an apparatus. The computer executable code includes code for generating a first frame including an indication of unused resources in a first basic service set (BSS) available to be shared with one or more wireless nodes in one or more second BSSs. The computer executable code also includes code for outputting the first frame for transmission to the one or more wireless nodes.

Certain aspects of the present disclosure provide a wireless node. The wireless node includes a transmitter and a processing system. The processing system is configured to generate a first frame including an indication of unused resources in a first basic service set (BSS) available to be shared with one or more wireless nodes in one or more second BSSs. The transmitter is configured to transmit the first frame to the one or more wireless nodes.

Certain aspects of the present disclosure provide an apparatus for wireless communication. The apparatus generally includes a first interface configured to obtain a first frame including an indication of unused resources in a first basic service set (BSS) available to be shared with the apparatus, wherein the apparatus is in a second BSS. The apparatus also includes a processing system configured to generate a second frame including an indication of an intent to use one or more of the unused resources. The apparatus further includes a second interface configured to output the second frame for transmission.

Certain aspects of the present disclosure provide a method for wireless communications that may be performed, for example, by an apparatus. The method generally includes obtaining a first frame including an indication of unused resources in a first basic service set (BSS) available to be shared with the apparatus, wherein the apparatus is in a second BSS. The method also includes generating a second frame including an indication of an intent to use one or more of the unused resources. The method further includes outputting the second frame for transmission.

Certain aspects of the present disclosure provide an apparatus for wireless communications. The apparatus generally includes means for obtaining a first frame including an indication of unused resources in a first basic service set (BSS) available to be shared with the apparatus, wherein the apparatus is in a second BSS. The apparatus also includes means for generating a second frame including an indication of an intent to use one or more of the unused resources. The apparatus further includes means for outputting the second frame for transmission.

Certain aspects of the present disclosure provide a computer-readable medium having computer executable code stored thereon for wireless communication by an apparatus. The computer executable code includes code for obtaining a first frame including an indication of unused resources in a first basic service set (BSS) available to be shared with the apparatus, wherein the apparatus is in a second BSS. The computer executable code also includes means for generating a second frame including an indication of an intent to use one or more of the unused resources. The computer executable code further includes means for outputting the second frame for transmission.

Certain aspects of the present disclosure provide a wireless node. The wireless node includes a receiver, a processing system, and a transmitter. The receiver is configured to receive a first frame including an indication of unused resources in a first basic service set (BSS) available to be shared with the wireless node, wherein the wireless node is in a second BSS. The processing system is configured to generate a second frame including an indication of an intent to use one or more of the unused resources. The transmitter is configured to transmit the second frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
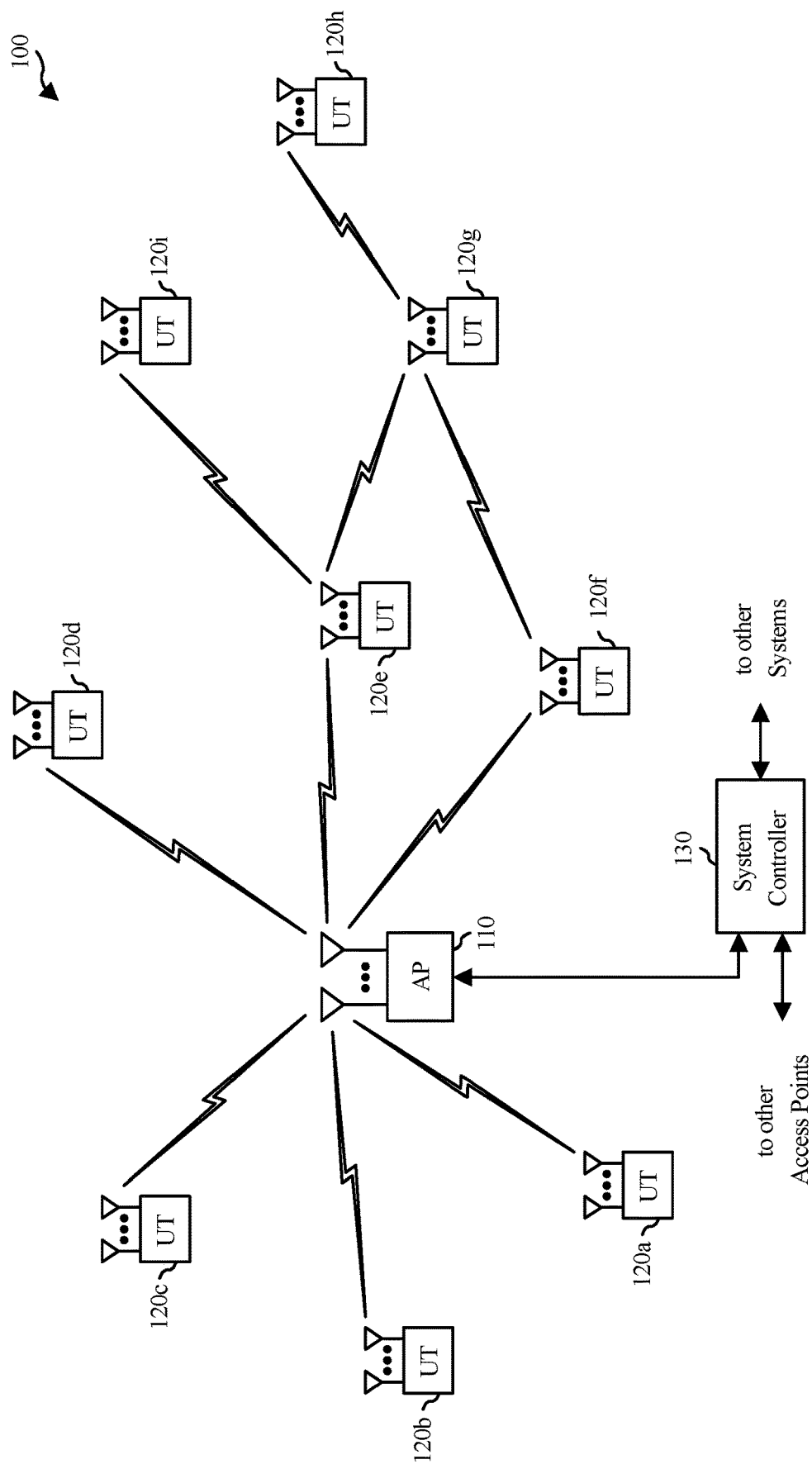
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a user terminal.

Multiple APs may transmit to multiple receiving user terminals at a time by using distributed multi-user multiple input multiple output (MU-MIMO). For example, multiple APs may transmit data to a given user terminal at a time, meaning the transmission of data to the user terminal is distributed between the multiple APs. The multiple APs may utilize beamforming to steer signals spatially to the user terminal. In some implementations, for the multiple APs to perform distributed MU-MIMO, the multiple APs coordinate the beamforming performed by each AP to reduce interference for transmitting data to the user terminal. In some implementations, the multiple APs perform a procedure to form a group of APs to transmit to the user terminal, as discussed herein. In some implementations, the multiple APs perform a procedure to form a group of APs to receive from one or more user terminals, as discussed herein. Further, in some implementations, to coordinate the beamforming between the multiple APs, the multiple APs perform a sounding procedure to gather feedback information from the user terminal about wireless channels between the multiple APs and the user terminal, as discussed herein. The multiple APs may utilize the feedback information to perform beamforming.

Particular implementations of the subject matter described in this disclosure can be implemented to realize one or more of the following potential advantages. For example, APs are able to form a group for transmitting to a user terminal using over the air signaling as opposed to communicating over a backhaul. This may reduce data congestion on the backhaul. Additionally, the sounding procedures may allow for coordinated gathering of feedback information by multiple APs from user terminals. Accordingly, the feedback information for the multiple APs may include channel conditions for each of the multiple APs coordinated in time, which may improve the accuracy of the beamforming based on the feedback information. Furthermore, the sounding procedures may limit the amount of data exchanged wirelessly to perform the sounding procedures, which may reduce bandwidth usage of wireless channels.

Example Wireless Communication System

FIG. 1 illustrates a multiple-access Multiple Input Multiple Output (MIMO) system 100 with access points and user terminals. For simplicity, only one access point 110 is shown in FIG. 1. An access point (AP) is generally a fixed station that communicates with the user terminals (UTs) and also may be referred to as a base station or some other terminology. A user terminal may be fixed or mobile and also may be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal also may communicate peer-to-peer with another user terminal. A system controller 130 couples to and provides coordination and control for the access points.

The MIMO system 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 also may utilize a single carrier or multiple carriers for transmission. Each user terminal may be equipped with a single antenna (such as in order to keep costs down) or multiple antennas (such as where the additional cost can be supported). The MIMO system 100 may represent a high speed Wireless Local Area Network (WLAN) operating in a 60 GHz band.

Figure 2:
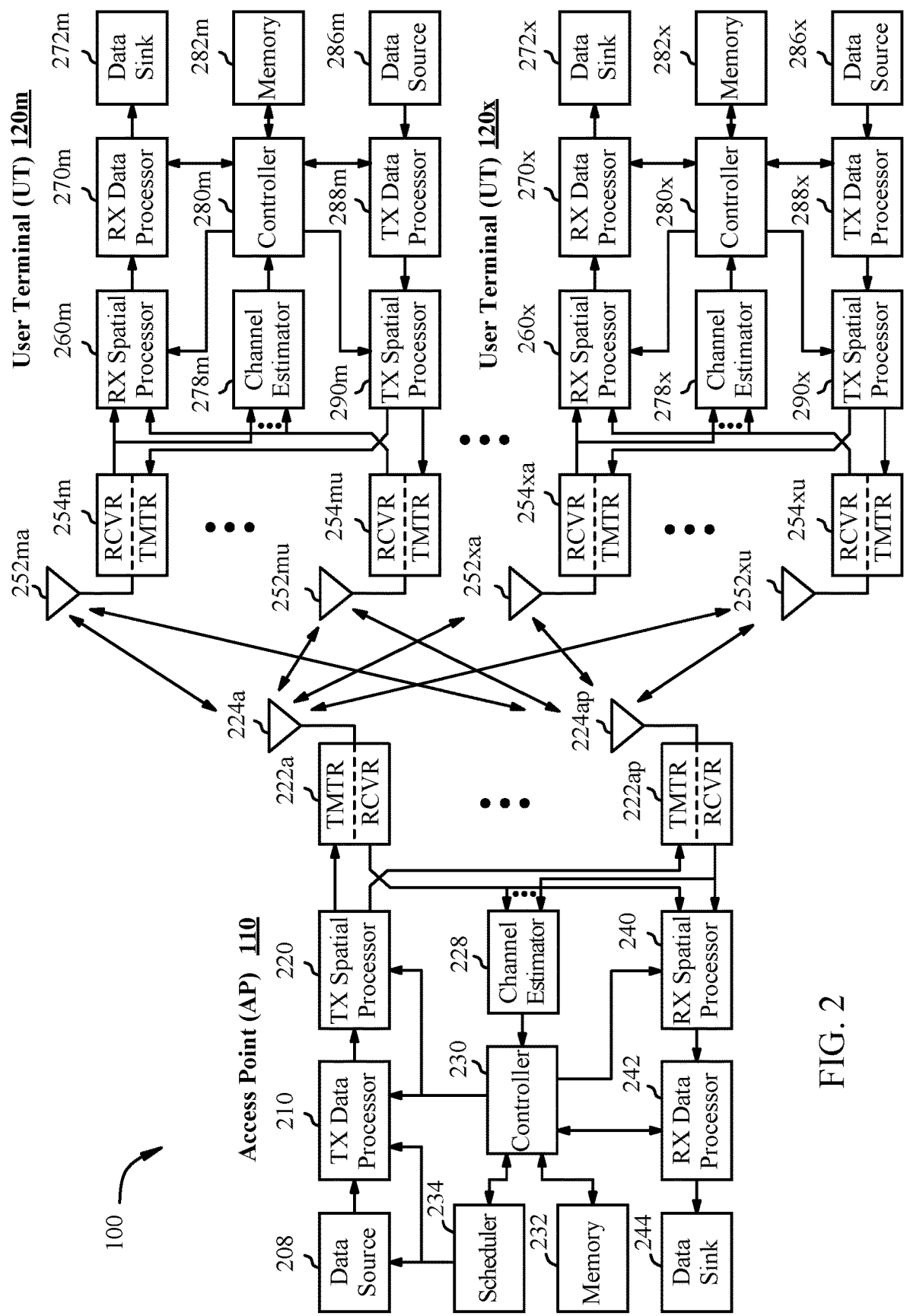
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 10, 10A, 11 and 11A.

FIG. 2 shows a block diagram of the access point/base station 110 and two user terminals/user equipments 120m and 120x in a MIMO system 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$, and $N_{dn}$ may include static values or can change for each scheduling interval. Beamforming (such as beamsteering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides Nan downlink data symbol streams for the Nan user terminals. A TX spatial processor 220 performs spatial processing on the Nan downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals. The decoded data for each STA may be provided to a data sink 272 for storage and/or a controller 280 for further processing.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
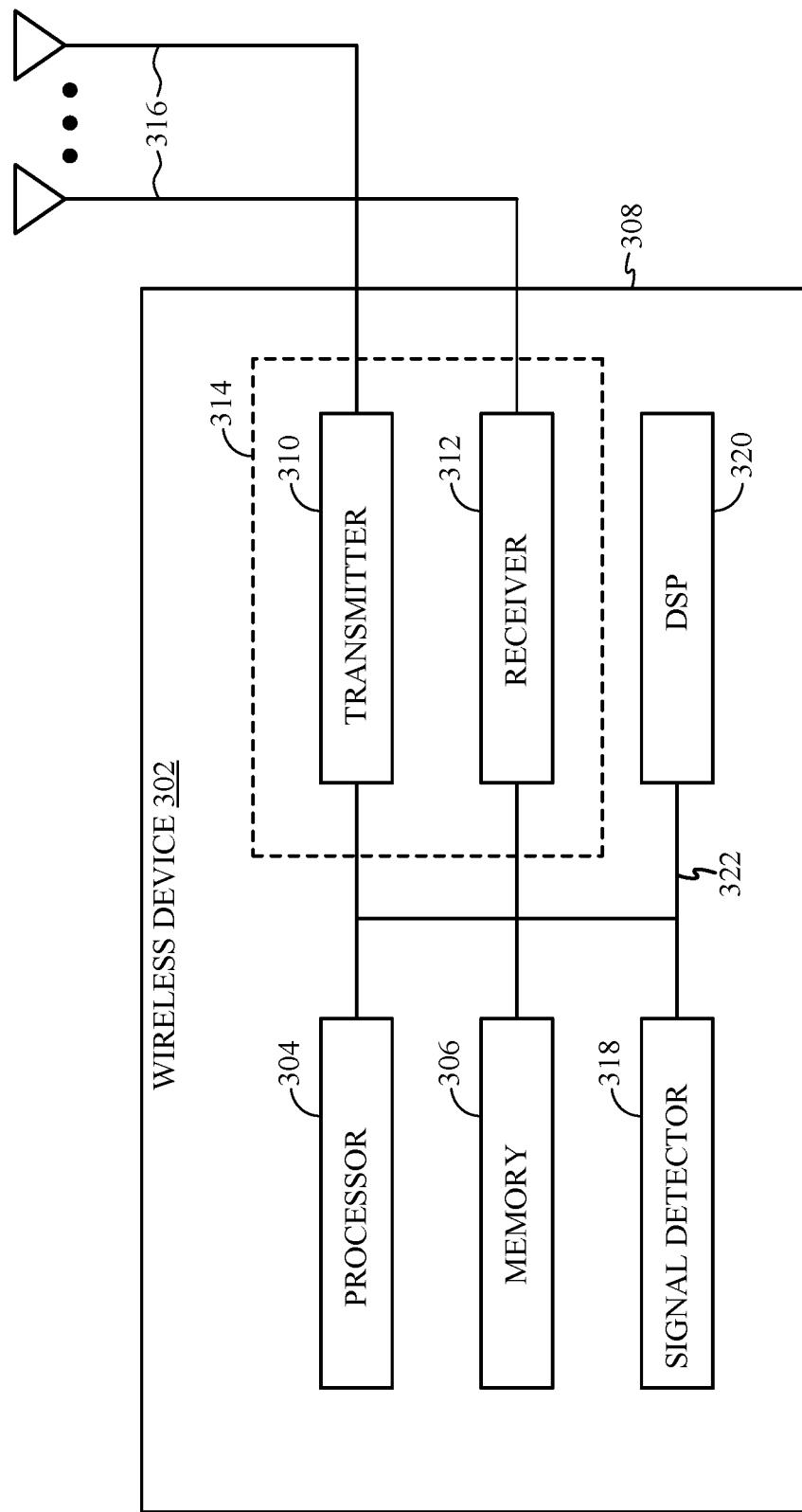
FIG. 3 illustrates an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

Example Distributed MU-MIMO

As discussed with respect to FIGS. 1-3, a single AP 110 may transmit to multiple receiving user terminals 120 at a time by using multi-user (MU) MIMO (MU-MIMO). In particular, the AP 110 includes multiple antennas 224. Using the multiple antennas 224, the AP 110 can utilize beamforming to focus the energy of a transmitted signal spatially (such as to a particular user terminal 120 as a spatial stream). In order to perform beamforming, the AP 110 may exchange frames with the user terminal 120 to measure a channel between the AP 110 and the user terminal 120. For example, the AP 110 may transmit a null data packet (NDP) including one or more long training fields (LTFs) that the user terminal 120 uses to measure the channel. The user terminal 120 may generate a channel feedback information (such as a feedback matrix) based on the channel measurements, and send the feedback matrix to the AP 110. Using the feedback matrix, the AP 110 may derive a steering matrix, which is used to determine how to transmit a signal on each antenna 224 of the AP 110 to perform beamforming. For example, the steering matrix may be indicative of a phase shift, power level, etc. to transmit a signal on each of the antennas 224. For example, the AP 110 may be configured to perform similar beamforming techniques as described in the 802.11ac standard.

In some implementations, multiple APs 110 may be configured to transmit to one or more receiving user terminals 120 at a time utilizing distributed MU-MIMO. There may be multiple different types of MU-MIMO transmissions, including coordinated beamforming (CoBF) and joint processing transmission (JT).

Figure 4:
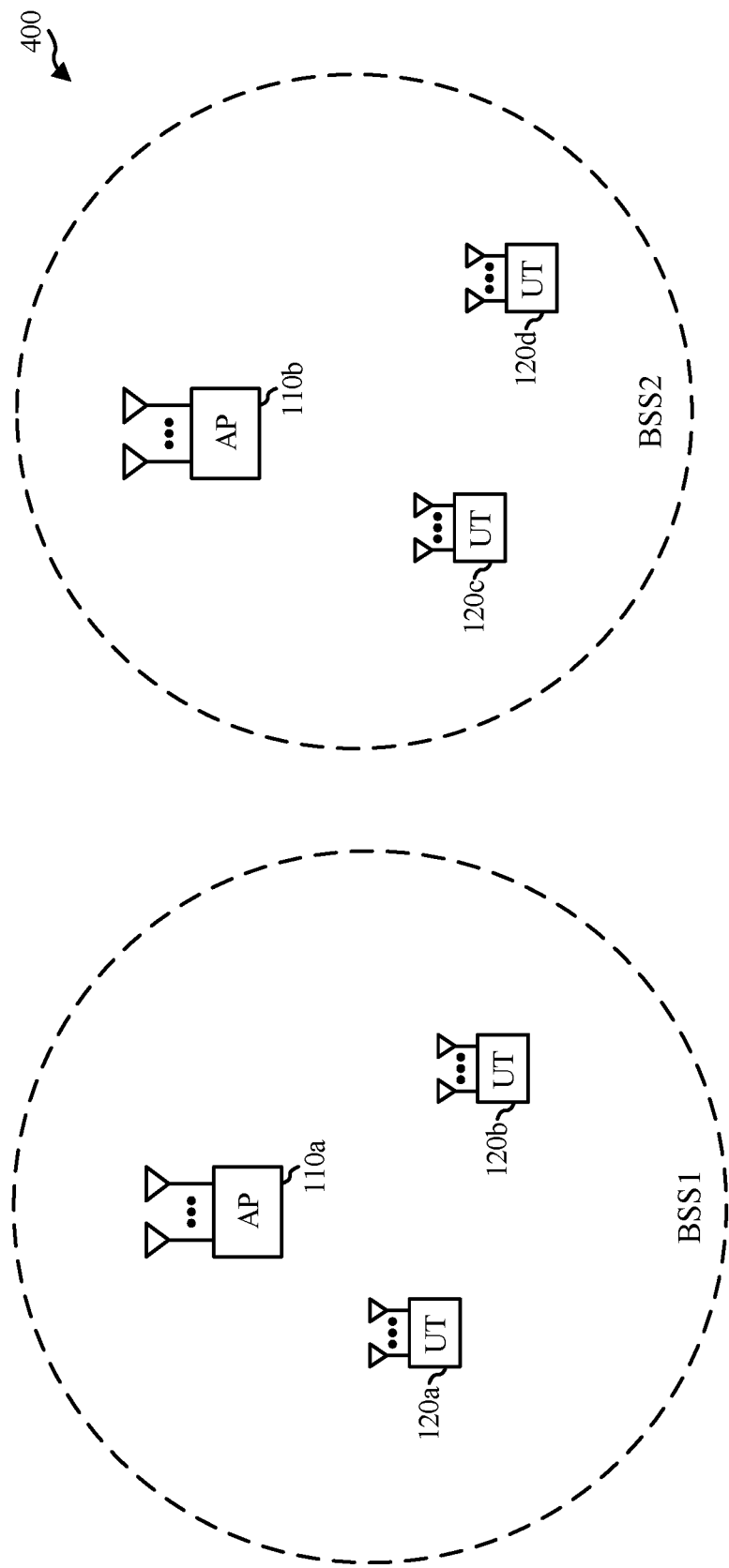
FIG. 4 illustrates an example of a distributed multi-user multiple-input-multiple-output (MU-MIMO) system), in accordance with certain aspects of the present disclosure.

FIG. 4 illustrates a distributed MU-MIMO system 400. As shown, system 400 includes an AP 110a and an AP 110b. The APs 110a and 110b, in some implementations, refer back to the AP 110 described with respect to FIG. 1. The AP 110a is shown as part of a first basic service set (BSS), BSS1, and the AP 110b is shown as part of a second BSS, BSS2. The AP 110a and the AP 110b may be neighboring APs. Further, portions of the coverage area of the AP 110a may overlap with portions of the coverage area of BSS2, leading to an overlapping BSS (OBSS) situation. Communications by the AP 110a with user terminals in BSS1 may be referred to as in BSS communications. Similarly, communication by the AP 110b with user terminals in BSS2 may be referred to as in BSS communications. Further, communications by the AP 110a with user terminals in BSS2 may be referred to as OBSS communications, and communications by the AP 110b with user terminals in BSS1 may be referred to as OBSS communications.

In CoBF, signals (such as data) for a given user terminal may be transmitted by only a single AP. For example, the user terminals 120a and 120b are shown as part of BSS1 and therefore only the AP 110a may transmit signals intended for the user terminals 120a and 120b. Further, user terminals 120c and 120d are shown as part of BSS2 and therefore only the AP 110b may transmit signals intended for the user terminals 120c and 120d. The user terminals 120a through 120d, in some implementations, refer back to the user terminal 120 described with respect to FIG. 1. However, as discussed the coverage area of the AP 110a and the AP 110b may overlap, and therefore signals transmitted by the AP 110a may reach the user terminals 120c and 120d in BSS2 as OBSS signals. Similarly, signals transmitted by the AP 110b may reach the user terminals 120a and 120d in BSS1 as OBSS signals. In CoBF, the APs 110a and 110b may be configured to perform beamforming to form nulls in the direction of user terminals in OBSS, such that any signals received at an OBSS user terminal are of a low power. For example, the AP 110a may be configured to perform beamforming to form nulls toward the user terminals 120c and 120d, and the AP 110b may be configured to form nulls toward the user terminals 120a and 120b to limit the interference at the user terminals. Accordingly, in CoBF, APs are configured to form nulls for OBSS user terminals and configured to beamform signals to in-BSS user terminals.

In JT, signals for a given user terminal may be transmitted by multiple APs. For example, one or more of user terminals 120a through 120d may receive signals from both the AP 110a and the AP 110b. For the multiple APs to transmit data to a user terminal, the multiple APs may all need a copy of the data to be transmitted to the user terminal. Accordingly, the APs may need to exchange the data (such as through a backhaul) between each other for transmission to a user terminal. For example, the AP 110a may have data to transmit to user terminal 120a, and may further communicate that data over a backhaul to the AP 110b. The AP 110a and the AP 110b may then beamform signals including the data to the user terminal 120a.

In some implementations, in JT, the antennas of the multiple APs transmitting to one or more user terminals may be considered as one large antenna array (such as virtual antenna array) used for beamforming and transmitting signals. Accordingly, similar beamforming techniques as discussed and used for transmitting from multiple antennas of a single AP to one or more user terminals, may instead be used for transmitting from multiple antennas of multiple APs. For example, the same beamforming, calculating of steering matrices, etc. for transmitting from multiple antennas of the AP 110a, may be applied to transmitting from the multiple antennas of both the AP 110a and the AP 110b. The multiple antennas of the multiple APs may be able to form signals on a plurality of spatial streams (such as limited by the number of antennas). Accordingly, each user terminal may receive signals on one or more of the plurality of spatial streams. In some implementations, each AP may be allocated a certain number of the plurality of spatial streams for transmission to user terminals in the BSS of the AP. Each spatial stream may be identified by a spatial stream index.

In some implementations, various factors may affect distributed MU-MIMO. For example, one factor may be channel feedback accuracy. As discussed, to perform beamforming APs may exchange signals with user terminals over a communication channel, and the user terminals may make measurements of the channel based on the exchanged signals. The user terminals may further send information regarding the channel measurements to the APs as channel feedback information. The APs may utilize the channel feedback information to perform beamforming. However, the channel conditions may change between when the APs receive the channel feedback information and when the APs actually transmit signals on the channel. This may be referred to as channel aging. Further, there may be inaccuracy due to quantization of the information included in the channel feedback information. This may impact both CoBF and JT distributed MU-MIMO and lead to leakage and interference.

Another factor may be phase offsets between APs. For example, APs may transmit with different phases due to timing synchronization differences between the APs. Further, the difference in phases may drift or change (such as due to phase noise, timing drift, carrier frequency offset (CFO) drift, etc.) between when the channel feedback information is received and when the APs transmit to the user terminals. This change in phase difference may not affect CoBF significantly as each AP performs beamforming independently. However, this change in phase difference may affect JT as the APs perform beamforming together.

Another factor may be timing offset. For example, the delay spread, filter delay, and arrival time spread of APs using JT and CoBF may need to be absorbed with a cyclic prefix (CP). For JT, additionally, the relative timing offset across APs (e.g., the change in timing offset between when the channel feedback information is measured and when the signals are transmitted) also may affect phase offsets and may need to be further controlled.

Another factor may be CFO. In CoBF, the synchronization requirements for CFO may be reduced as compared to JT. Another factor may be gain mismatch, where different APs use different gain states while measuring channels of user terminals. This may have a larger effect on JT than CoBF. In some implementations of CoBF, the largest gain may be approximately 75% of the minimum of number of transmit antennas of any of the APs. In some implementations of JT, the largest gain may be approximately 75% of the sum of the transmit antennas of all the APs.

In some implementations, in MU-MIMO for a single AP transmitting to multiple user terminals, to perform channel measurements for beamforming, all the transmit antennas of the AP are sounded together, meaning that all the transmit antennas transmit NDP during the same transmission time interval (such as TTI, frame, subframe, etc.). All antennas may be sounded together, because if NDPs for each antenna were transmitted at different TTIs, they may be transmitted with different phases and the receiver automatic gain control (RxAGC) at each user terminal receiving the NDPs may be different for different TTIs, which may make it difficult to stitch together measurements from the different NDPs. Further, the relative timing among all transmit antennas for transmitting NDP at the same TTI is constant for all the transmit antennas, and remains the same for when the NDP is transmitted and for when data is later transmitted to the user terminals based on channel feedback information. Therefore, there is no change in relative timing between NDP transmission and data transmission, thereby ensuring better beamforming.

In some implementations, all antennas for multiple APs may be sounded together to transmit NDP together at the same TTI for JT in a joint sounding procedure, to avoid issues discussed. In some implementations, the NDPs of different APs may be sounding at the same TTI using one or more techniques such as time-division multiplexing (TDM), code-division multiplexing (CDM) (such as using a P-matrix), and frequency-division multiplexing (FDM).

For CoBF, the beamforming direction of one AP does not depend on the channels between user terminals and other APs. Accordingly, only loose synchronization may be needed between APs. Therefore, for CoBF, in addition to being able to use a joint sounding procedure, a sequential sounding procedure can be used where APs sound one at a time in separate TTIs and transmit NDPs at different TTIs per AP.

Example Coordinated Downlink (DL) and Uplink (UL) Communications

In downlink (DL) MU-MIMO, multiple stations may belong to one basic service set (BSS) transmitting in the DL. Other BSSs (e.g., OBSSs) within "hearing" range may defer (not transmit on the medium) in response to detecting an on-going transmission. Different BSSs in hearing range of each other may use time-divisional multiplexing (TDM) to transmit in the DL. In coordinated DL MU-MIMO, multiple BSSs carry out simultaneous DL transmissions. Un-used receive spatial dimensions at the AP may be used to null the interference from the other BSS transmissions. This enables a greater degree of spatial multiplexing when there are un-used spatial dimension within the BSS. In other words, the un-used spatial dimensions may allow for concurrent OBSS transmissions in DL.

Figure 5A:
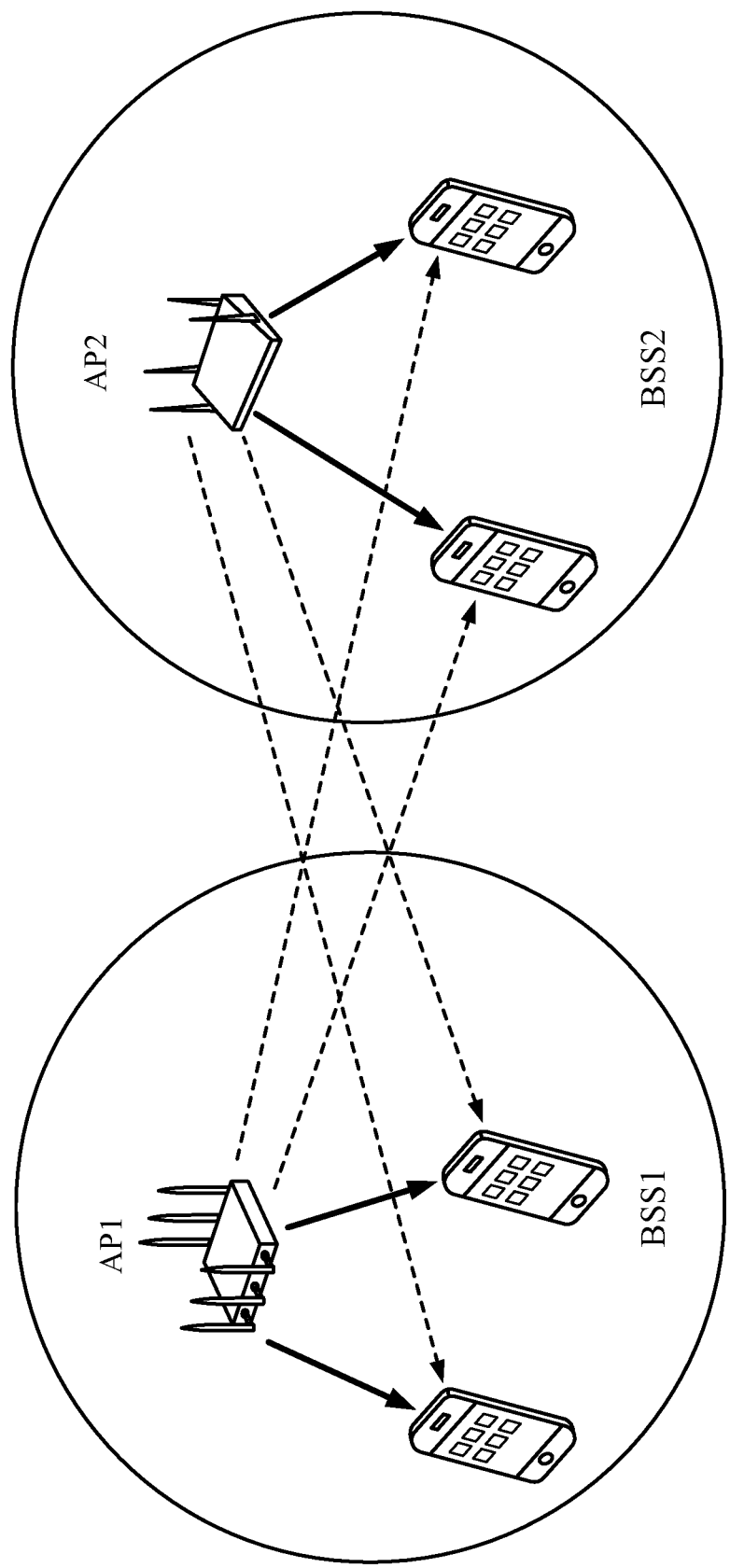
FIG. 5A illustrates a communication system using coordinated downlink (DL) multi-user multiple-input-multiple-output (MU-MIMO), in accordance with certain aspects of the present disclosure.

FIG. 5A illustrates a communication system using coordinated DL MU-MIMO, in accordance with certain aspects of the present disclosure. As illustrated, the signal from each AP is transmitted to only stations within their respective BSSs, as shown by the solid lines representing data transmissions from the AP the STAs that are associated with the AP. The data transmissions from the APs cause interference to the other OBSS stations, as illustrated by the dotted lines. Un-used dimensions at the AP may be used to get rid of (e.g., null out) interference from OBSS APs.

In uplink (UL) MU-MIMO, multiple stations may belong to one basic service set (BSS) transmitting in the UL. Other BSSs within hearing range may defer to an on-going transmission. Different BSSs in hearing range of each other may use time-divisional multiplexing (TDM) to transmit in the UL. In coordinated UL MU-MIMO, multiple BSSs may carry out simultaneous UL transmissions. As with DL MU-MIMO, un-used receive spatial dimensions at an AP may be used to null the interference from the other BSS (OBSS) transmissions, enabling a greater degree of spatial multiplexing and allowing for concurrent OBSS transmissions.

Figure 5B:
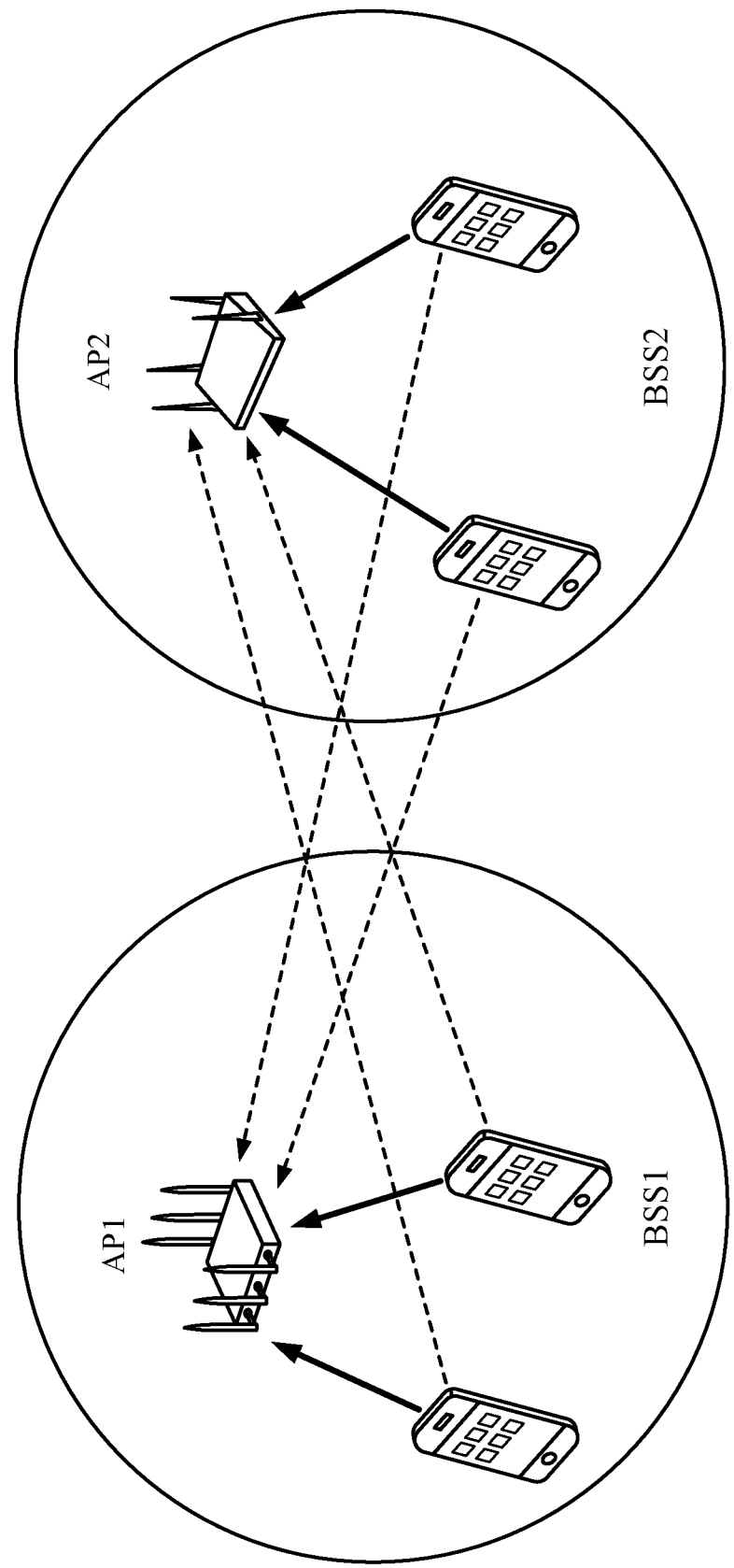
FIG. 5B illustrates a communication system using coordinated uplink (UL) multi-user multiple-input-multiple-output (MU-MIMO), in accordance with certain aspects of the present disclosure.

FIG. 5B illustrates a communication system using coordinated UL MU-MIMO, in accordance with certain aspects of the present disclosure. As illustrated, the signal from each station is transmitted to only one AP within their respective BSSs, as shown by the solid lines representing data transmissions to the AP the STAs are associated with. The data transmissions from the STAs cause interference to the other OBSS APs, as illustrated by the dotted lines. Un-used dimensions at each AP may be used to get rid of (e.g., null out) interference from OBSS STAs.

Example Sounding Procedures for Distributed Communications

In some cases, distributed communications (e.g., DL or UL distributed MU transmissions) may include one or more synchronization protocols. Using coordinated beamforming (CoBF) as a reference example of a type of distributed communications, a variety of sounding options can be used to synchronize APs and/or UTs in multiple BSSs for distributed communications. As illustrative but non-limiting examples, two high level sounding options for explicit sounding with each high level sounding option including three sub-options are described herein.

As will be described in greater detail below, the high level sounding options may include sequential sounding (communication protocols 600A-600C in FIGS. 6A-6C) and joint sounding (communication protocols 700A-700C in FIGS. 7A-7C). Sequential sounding may involve one null data packet (NDP) transmission per AP and may sound one AP at a time. In these cases, existing sounding sequences (e.g., 802.11ax sounding sequence(s)) may be leveraged with certain modifications. As an example modification, a null data packet announcement (NDPA) may address OBSS STAs. Joint sounding may use one NDP to sound Tx chains of all the APs. Joint sounding may use slightly less overhead due to certain preamble savings. The NDP may be time division multiplexed (TDM'd), code division multiplexed (CDM'd) (P matrix), or frequency division multiplexed (FDM'd) among Tx chains of all APs.

Figure 6A:
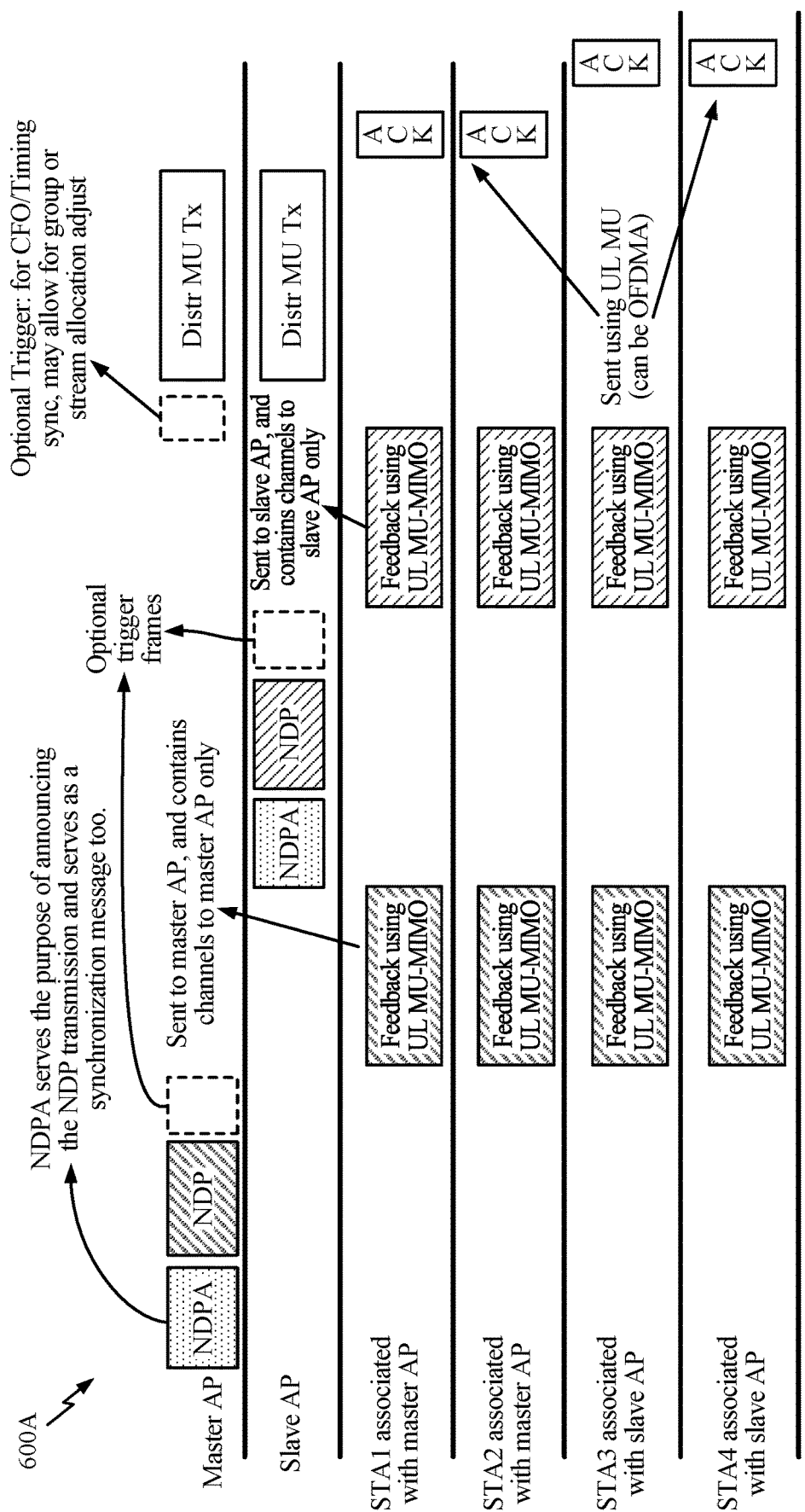
FIGS. 6A-6C illustrate example communication protocols for coordinated beamforming (CoBF) including explicit sounding, in accordance with certain aspects of the present disclosure.

With respect to the sequential sounding options, FIG. 6A shows an example communication protocol 600A for CoBF utilizing explicit sounding. In particular, communication protocol 600A includes sequential NDP transmissions, such that a single AP at a time transmits an NDPA and NDP. The NDPA transmission may identify all STAs and number of streams being allocated to each STA. Further, the NDPA may serve the purpose of announcing the NDP transmission and may serve as a synchronization message as well. In one or more cases, as shown, an optional trigger frame may be provided after the NDPA and NDP transmissions. In some cases, the trigger frame indicates when the different stations should send the solicited (CSI) feedback. The stations (STA1 through STA4) may then respond by transmitting feedback using UL MU-MIMO to the corresponding AP that sent the NDPA and NDP. Using the CSI provided during this feedback portion of the protocol, distributed transmissions (Distr MU Tx) may follow along with acknowledgements (ACK) from the stations (STA1 through STA4) as shown. The acknowledgements may be sent using UL MU (can be OFDMA). In one or more cases the ACKs of the two BSSs may be sent in parallel using coordinated UL MU-MIMO.

Figure 6B:
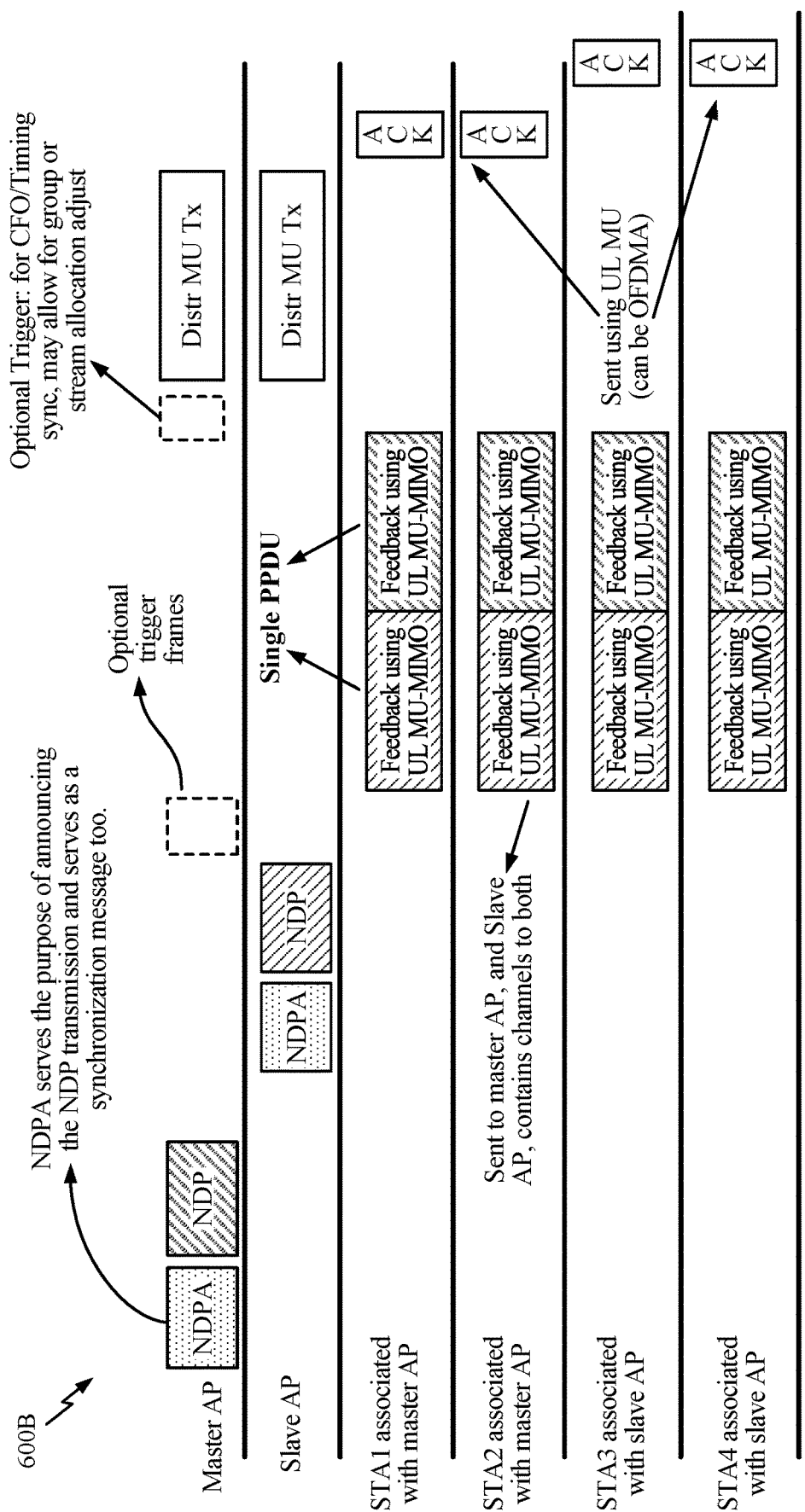

FIG. 6B shows another example communication protocol 600B for CoBF including explicit sounding. In particular, communication protocol 600B shows sequential NDP transmissions along with UL MU-MIMO where both APs receive all four feedback streams without nulling. Compared to communication protocol 600A in FIG. 6A, the master AP and the slave AP may transmit their respective NDPA and NDP sequentially. This may be followed by an optional trigger frame. The stations (STA1, STA2, STA3, and STA4) may each then transmit feedback using UL MU-MIMO that contains information for channels to both the master AP and the slave AP. Compared to communication protocol 600A in FIG. 6A, this may be done using a single protocol data unit (PDU), such as a physical PDU (PPDU), as shown in the figure.

Rate and power control may be complex with the communication protocols 600A and 600B as illustrated in FIGS. 6A and 6B, respectively. Therefore, other variations on these protocols may be provided in accordance with certain aspects. As an example, in protocols 600A and 600B, the UL MU-MIMO feedback may consist of STAs 1, 2, 3 and 4 transmitting their CSI to the AP together. An AP may receive UL MU-MIMO with STAs of its own BSS and STAs of an OBSS. However, the powers of in-BSS and OBSS STAs might be very different, making rate and power control more complex.

Figure 6C:
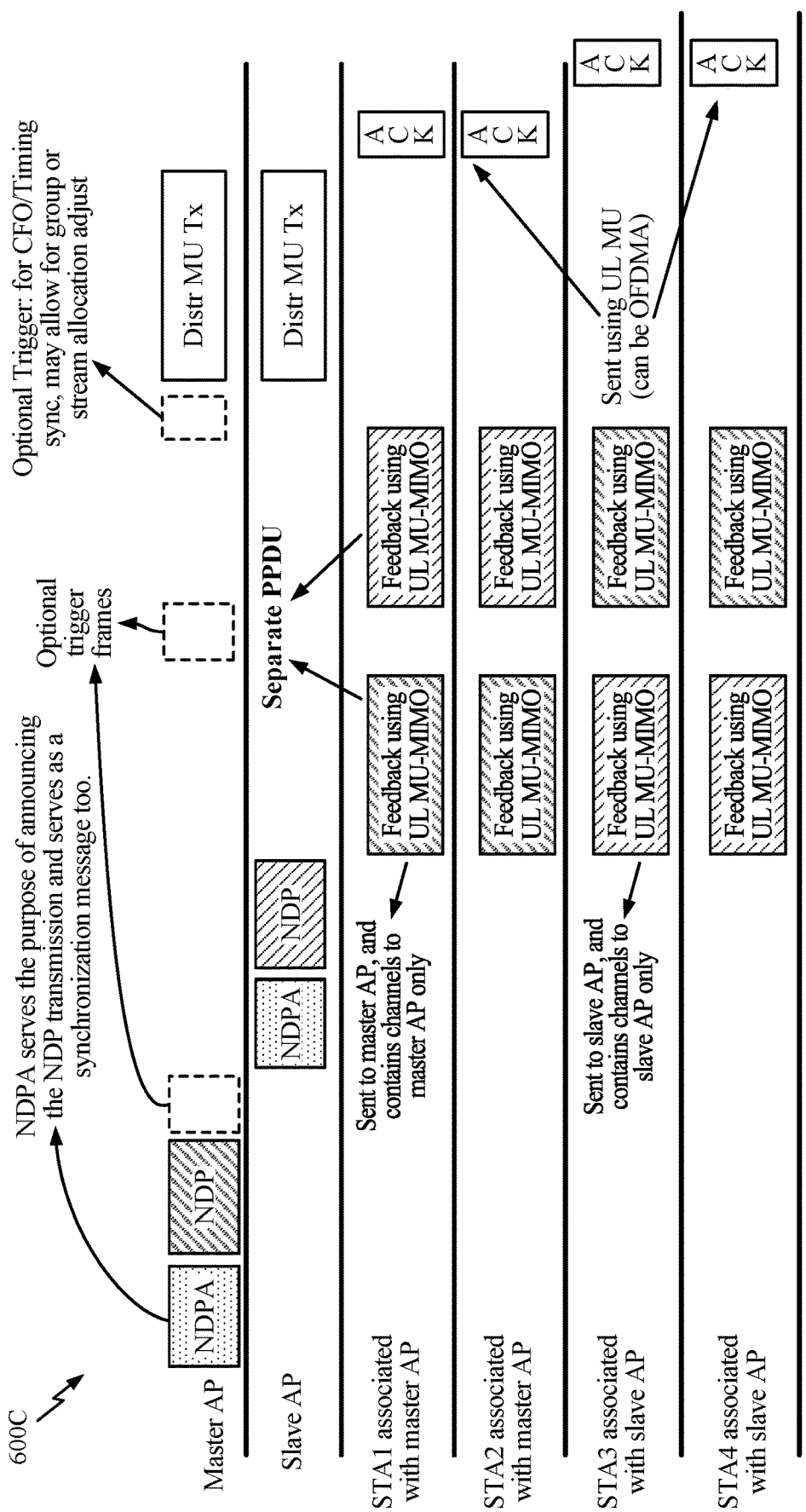

FIG. 6C shows another communication protocol 600C for providing CSI feedback (e.g., for explicit sounding) that may help avoid or reduce complexity that may be associated with communication protocols 600A and 600B. Particularly, the communication protocol 600C includes sequential NDP and coordinated UL MU-MIMO where multiple APs receive CSI feedback together while using spatial dimensions to null out some streams. As shown, a master AP may transmit an NDPA, an NDP, and an optional trigger frame followed by a slave AP transmitting its own NDPA and NDP. Compared to communication protocols 600A and 600B in FIGS. 6A and 6B, respectively, the stations STA1 and STA2 (associated with the master AP) in communication protocol 600C in response to the NDPA and NDP transmissions may, at a first time, transmit feedback using UL MU-MIMO to the master AP that contains channels to the master AP only. In the illustrated example, at the same first time, feedback from stations STA3 and STA4 (associated with the slave AP) was also sent to the slave AP that contains channels to slave AP only.

At a second time, the stations STA1-STA4 switch and STA1 and STA2 transmit to the slave AP, while STA3 and STA4 transmit to the master AP, as shown, using separate PPDUs. An optional trigger frame may be transmitted between the first and second time by the master AP as shown. What follows then may include distributed transmissions (Distr MU Tx) and acknowledgements (ACK) from the stations (STA1 through STA4). The acknowledgments may be sent using UL MU (e.g., OFDMA). In one or more cases, the ACKs of the two BSSs may be sent in parallel using coordinated UL MU-MIMO.

Various options may be provided for the communication protocols 600A-600C. For example, for the communication protocol 600A, one BSS at a time may provide a collection of CSI feedbacks from all STAs. For the communication protocol 600B, all STAs may transmit CSI together in a combined packet that contains CSI to all APs. For the communication protocol 600C, STAs may transmit their own APs first and subsequently to OBSS APs. In one or more cases, dual triggers (one from each AP) before a set of UL feedbacks may be implemented. Further, exact location (in time) of triggers may vary from the ones shown in FIGS. 6A-6C.

Figure 7A:
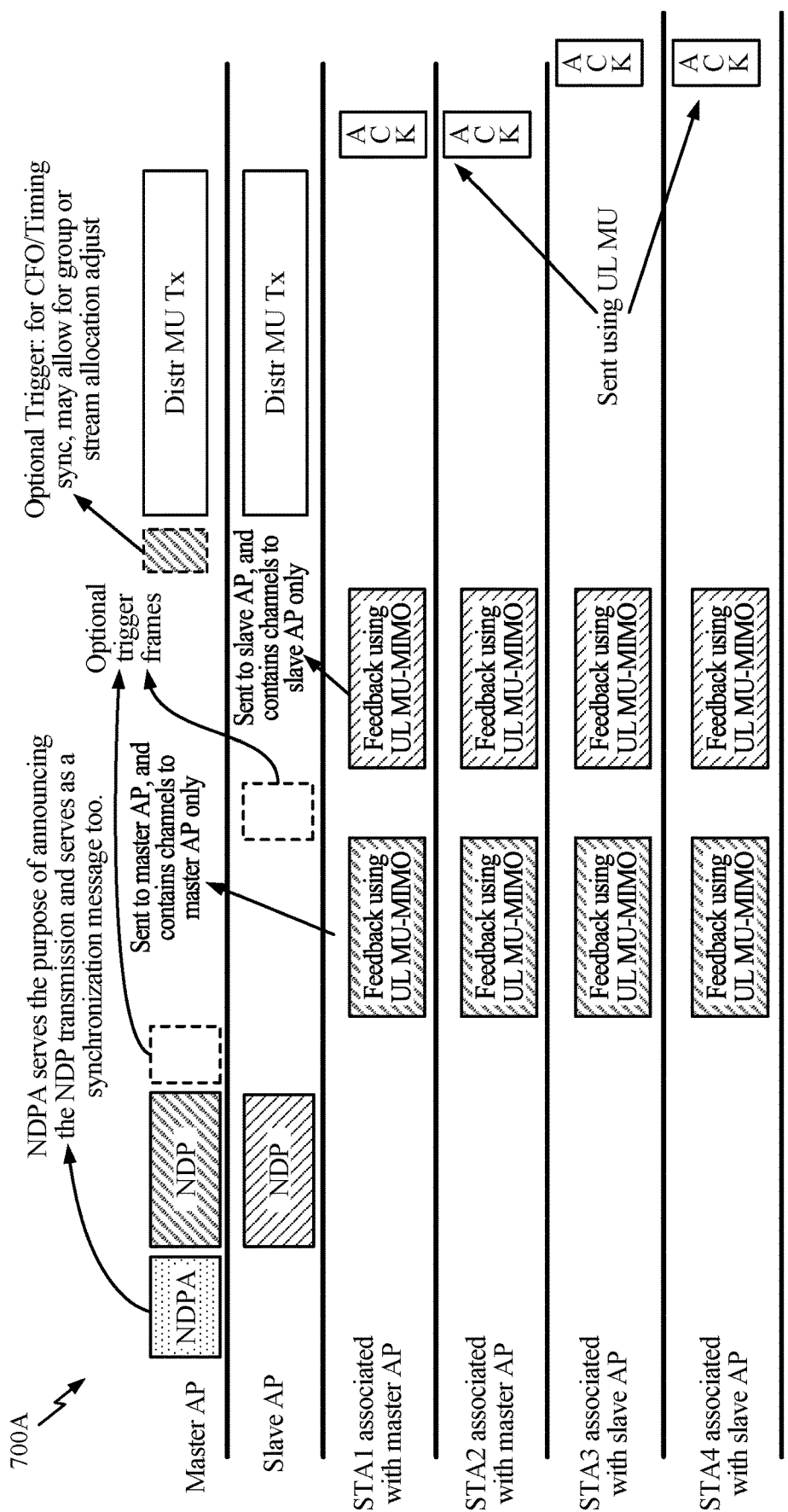
FIGS. 7A-7C illustrate example communication protocols for CoBF including explicit sounding, in accordance with certain aspects of the present disclosure.

With respect to the joint sounding options, FIG. 7A illustrates a communication protocol 700A for CoBF including explicit sounding. In particular, communication protocol 700A may include joint NDP transmission (e.g., NDP transmitted jointly from both APs), regular UL MU-MIMO, and separate feedback packets. For example, all the APs may be sounded with one NDP. The master AP may then receive feedback from all stations (STA1-STA4) using UL MU-MIMO at a first time that contains channels to the master AP only. The slave AP may then receive feedback from stations (STA1-STA4) using UL MU-MIMO at a second time that contains channels to the slave AP only. What follows then may include distributed transmissions (Distr MU Tx) and acknowledgements (ACK) from the stations (STA1 through STA4). The acknowledgements may be sent using UL MU (e.g., OFDMA). In one or more cases, the ACKs of the two BSSs may be sent in parallel using coordinated UL MU-MIMO.

Figure 7B:
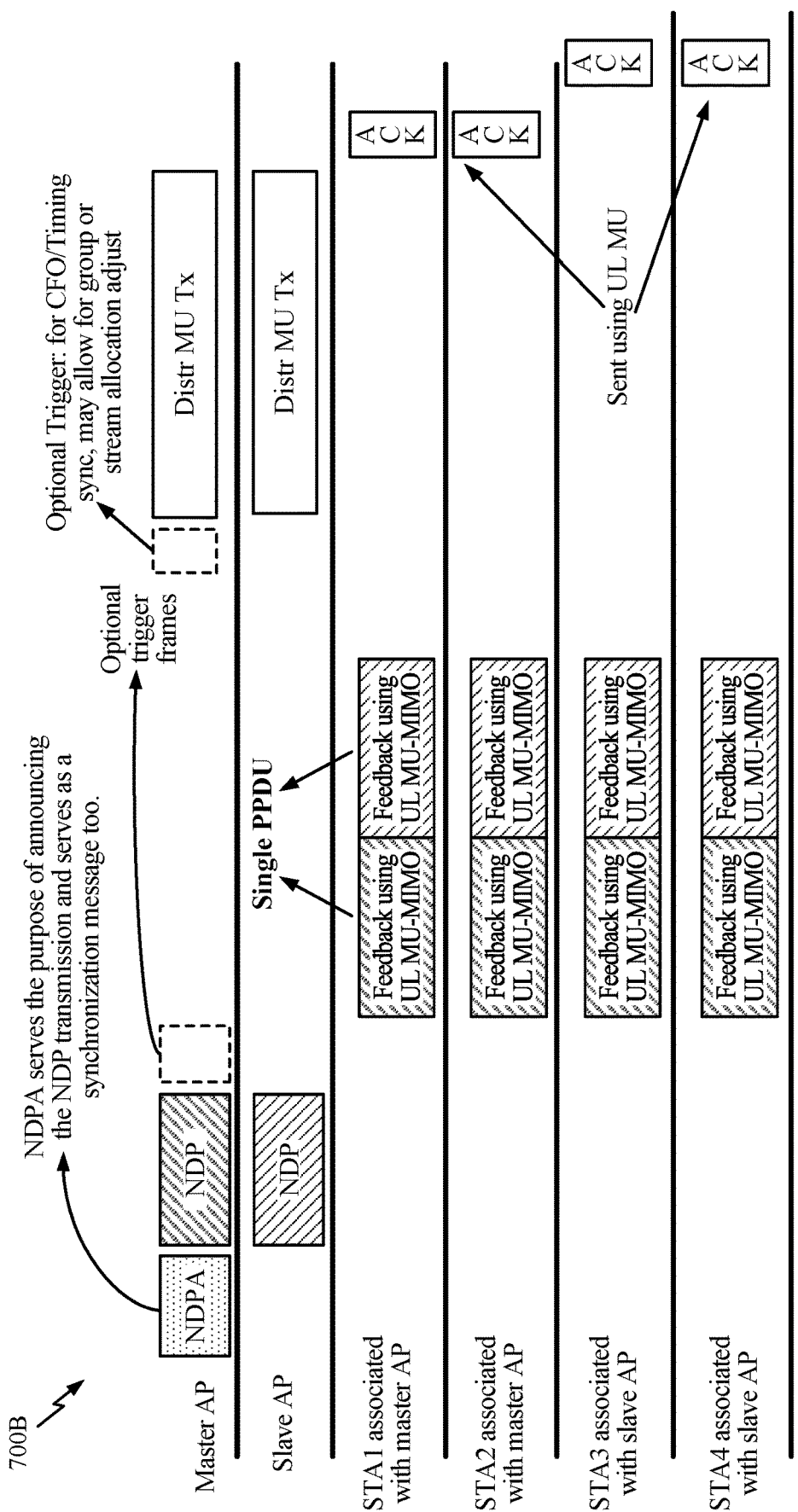

FIG. 7B illustrates another example communication protocol 700B (e.g., explicit sounding) for CoBF that includes joint NDP transmission, regular UL MU-MIMO, and combined feedback packets. For example, all the APs may be sounded with one NDP. Compared to communication protocol 700A in FIG. 7A, the master AP and slave AP in response to the joint NDP transmission may then both receive feedback from stations STA1-STA4 using UL MU-MIMO at a first time that contains channels to both master and slave APs using a single PPDU.

Figure 7C:
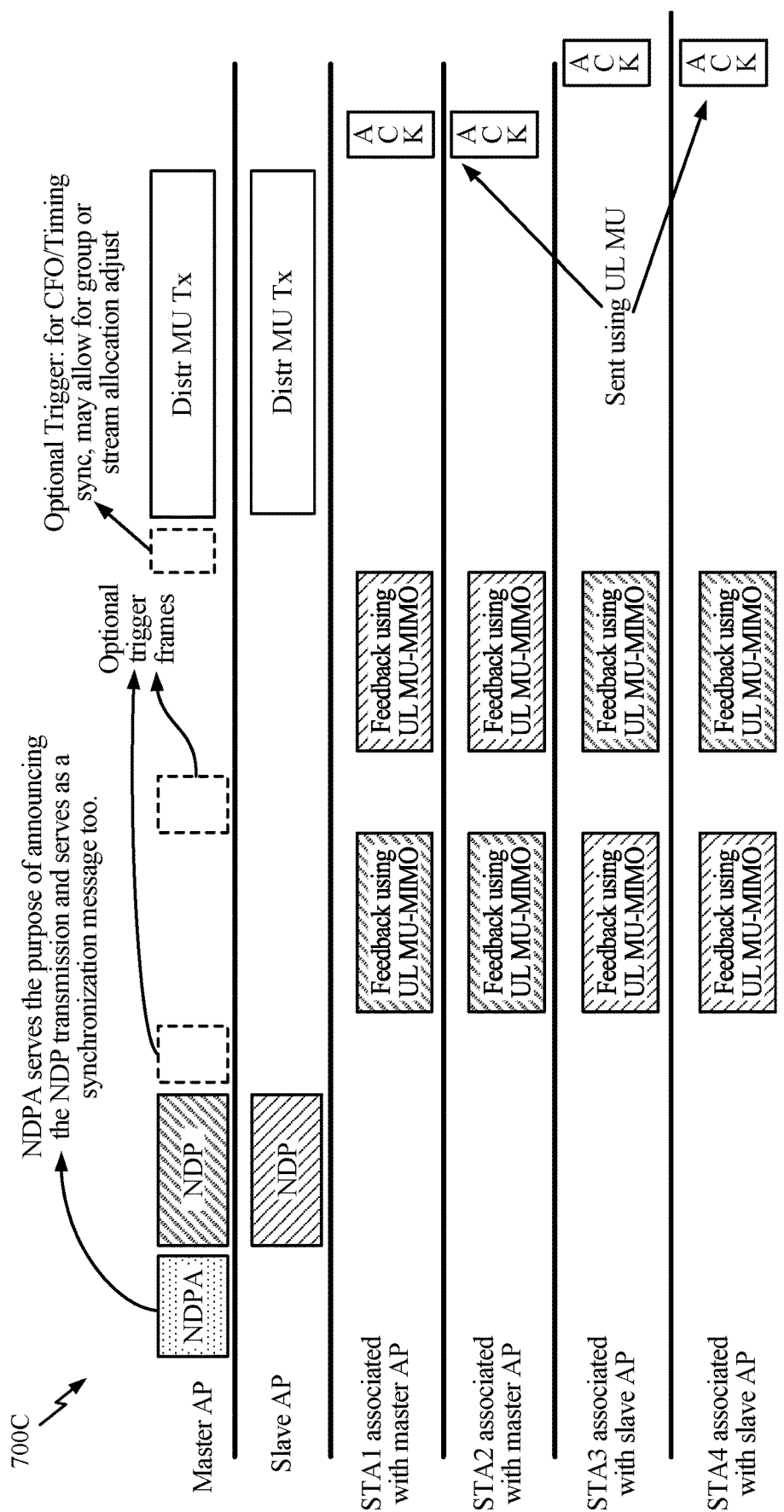

FIG. 7C illustrates another example communication protocol 700C for CoBF (e.g., with explicit sounding) that includes joint NDP transmission, coordinated UL MU-MIMO, and separate feedback packets. For example, all the APs may be sounded with one NDP. Compared to communication protocols 700A and 700B in FIGS. 7A and 7B, respectively, the master AP may then receive feedback from stations STA1 and STA2 using UL MU-MIMO at a first time that contains channels to master AP only. The slave AP may receive feedback from stations STA3 and STA4 using UL MU-MIMO at the same first time that contains channels to the slave AP only. At a second (subsequent) time, the master AP may receive feedback from STA3 and STA4, while the slave AP receives feedback from STA1 and STA2, as shown.

Various options may be provided for the communication protocols 700A-700C. For example, for the communication protocol 700A, one BSS at a time may provide collection of CSI feedbacks from all STAs along with a joint NDP. For the communication protocol 700B, all STAs may transmit CSI together in a combined packet that contains CSI to all APs along with a joint NDP. For the communication protocol 700C, STAs may transmit to their own APs first and then they may transmit to their OBSS APs along with joint NDP. In one or more cases, dual triggers (one from each AP) before a set of UL feedbacks may be implemented. Further, exact location (in time) of triggers may vary from the ones shown in FIGS. 7A-7C.

In some cases, additional sounding options may include one or more implicit sounding options. For example, an implicit sounding option may include separate UL NDP transmission per STA (e.g., communication protocol 800A in FIG. 8A) and/or joint UL NDP transmission from all STAs (e.g., communication protocol 800B in FIG. 8B).

Figure 8A:
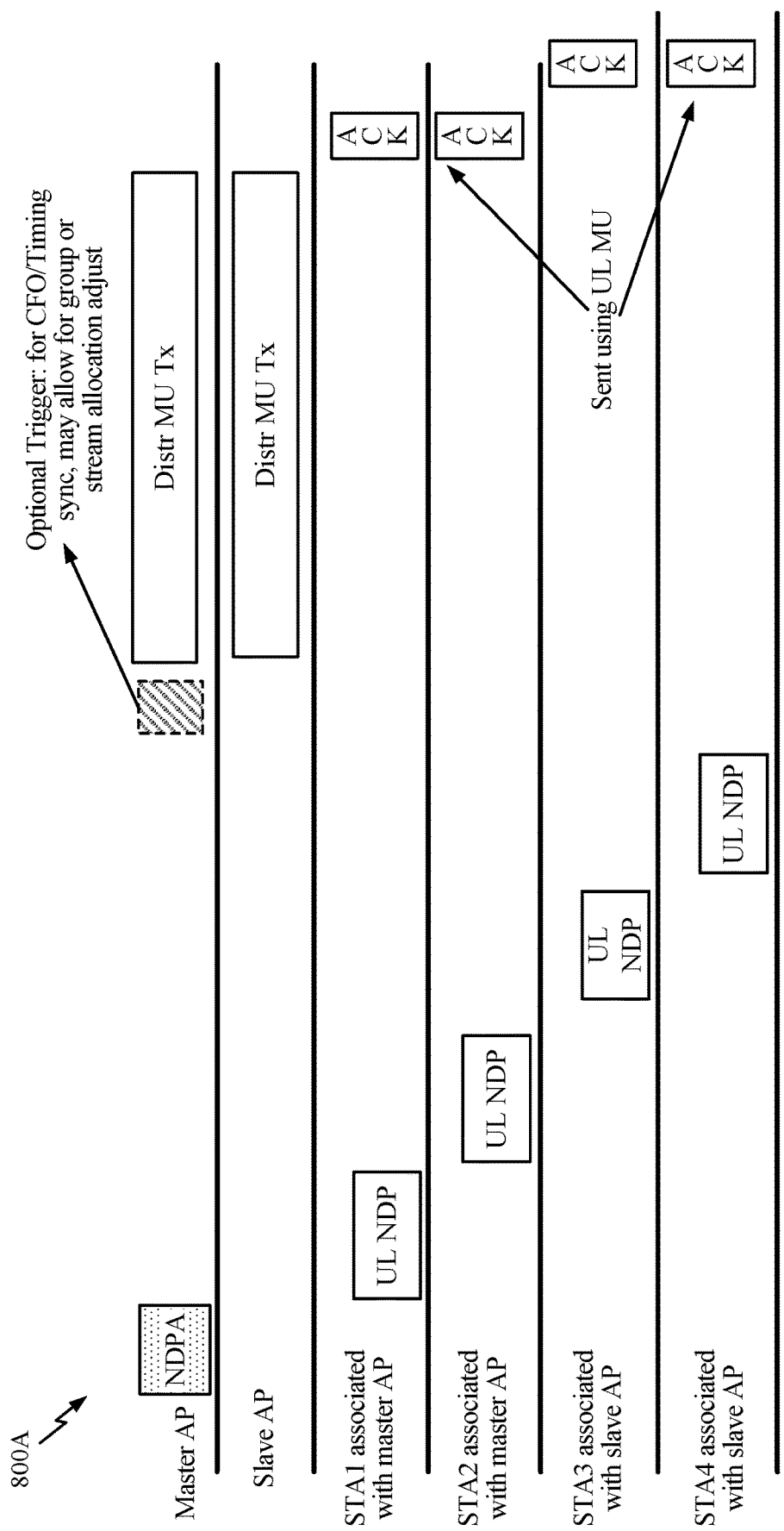
FIGS. 8A-8B illustrate example communication protocols including implicit sounding, in accordance with certain aspects of the present disclosure.

FIG. 8A illustrates a communication protocol 800A including implicit sounding that includes separate NDP transmission for each station. For example, as illustrated, one station at a time (e.g., STA1, then STA2, then STA3, then STA4) transmits UL NDP transmissions. The DL channel estimation (used for subsequent distributed DL transmissions) may rely on the UL NDP from the STAs. These UL NDP transmissions may then be followed by the optional trigger for CFO/Timing synchronization that may allow for group or stream allocation adjustments. What follows then may include distributed transmissions (Distr MU Tx) and acknowledgements (ACK) from the stations (STA1 through STA4). The acknowledgements may be sent using UL MU (e.g., OFDMA). In one or more cases, the ACKs of the two BSSs may be sent in parallel using coordinated UL MU-MIMO.

Figure 8B:
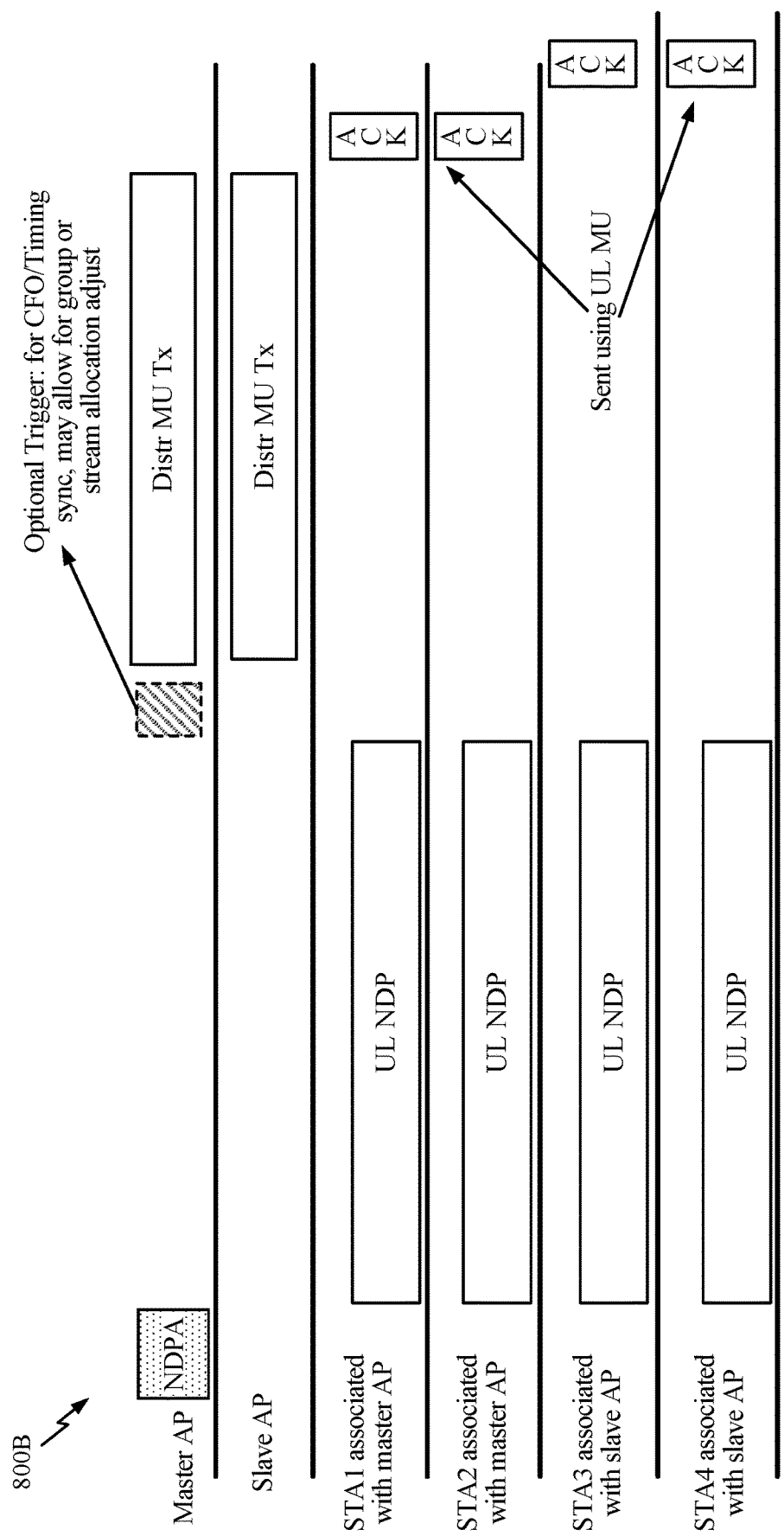

FIG. 8B illustrates another example communication protocol 800B including implicit sounding. Compared to communication protocol 800A in FIG. 8A, the communication protocol 800B includes joint NDP for all stations such that all stations (STA1-STA4) transmit the UL NDP transmissions at one time. In this example, the DL channel estimation may therefore rely ono the UL NDPs simultaneously sent from all of the STAs.

In one or more cases, when the NDPs are being sent together in communication protocol 800B, the LTFs may be multiplexed using any of the techniques described above with reference to DL NDPs transmitted from multiple APs (e.g., FDM, P-matrix, and/or TDM). In one or more cases, ACKs may be sent in one BSS using UL MU-MIMO and sequentially across BSSs. In some cases, ACKs may be sent using OFDMA as well. Further, in some cases, the ACKs of multiple BSSs may be sent together as well, for example, using coordinated UL MU-MIMO, coordinated UL OFDMA, or a mixture thereof.

Note that, for the communication protocols 600A-600C in FIGS. 6A-6C, the communication protocols 700A-700C in FIGS. 7A-7C, and the communication protocols 800A-800B in FIGS. 8A-8B, it may be assumed that group formation has taken place before the NDPA transmission(s) shown in each communication protocol. Assuming the group formation has taken place, the NDPA transmission(s) may identify all STAs and number of streams being allocated to each STA.

Further, there may be various options to multiplex NDPs from different APs or STAs transmitted at the same time. For example, using frequency division multiplexing, each stream may be allocated different tones in each LTF symbol. In some cases, along with FDM, beam steering matrix (P-matrix) may be used to multiplex the streams of an AP, while different APs are allocated non-overlapping tones. As an alternative, all streams (from all APs) could be multiplexed using a large P-matrix. Using time division multiplexing, one stream may be allocated one LTF. This TDM approach could be combined with P-matrix multiplexing, for example, with one AP's streams multiplexed using P-matrix, while different APs are active on different LTF symbols.

Example of Generalized Distributed MU Transmissions

Aspects presented herein provide group formation protocols for distributed (DL or UL) communications (e.g., across multiple BSSs).

In certain systems (e.g., 802.11ax), an AP in one BSS may transmit to or receive from multiple STAs (e.g., in the same BSS) simultaneously while giving the STAs orthogonal frequency or spatial stream resources. For example, simultaneous transmission can be achieved using DL OFDMA (which may be combined with MU-MIMO). Similarly, simultaneous reception can be achieved using UL OFDMA (which may be combined with MU-MIMO). Simultaneous reception using UL OFDMA may be referred to as UL MU transmission, which may be trigger based.

However, while some systems may support simultaneous transmissions and receptions to and from STAs within a BSS, such systems may not support multiple BSSs (e.g., within hearing range of each other) using unused resources within one or more of the multiple BSSs for simultaneous transmissions/receptions. The unused resources, for example, may include unused frequency resources within a BSS, unused spatial stream resources at an apparatus (e.g., AP) within a BSS, etc.

Figure 9:
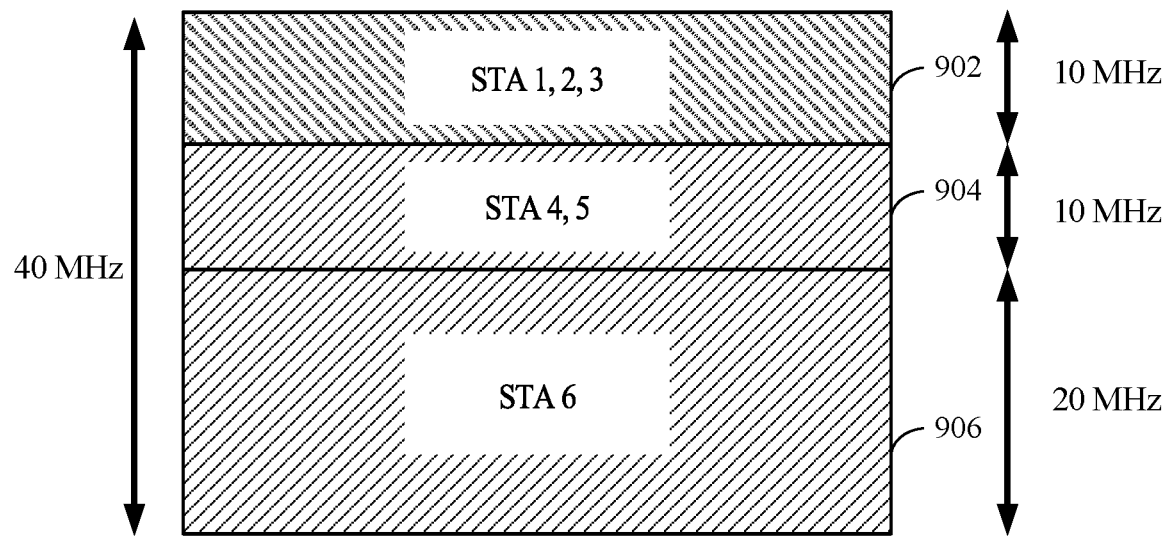
FIG. 9 illustrates an example of frequency sharing among multiple basic service sets, in accordance with certain aspects of the present disclosure.

FIG. 9 illustrates an example of two neighboring BSSs sharing frequency resources for distributed communications (e.g., coordinated OFDMA), in accordance with aspects of the present disclosure. In this example, STAs 1, 2, and 3 belong to a first BSS (BSS1) and STAs 4, 5, and 6 belong to a second BSS (BSS2). BSS1 may use 10 MHz portion 902 of the 40 MHz spectrum for communications with STAs 1, 2, and 3 in BSS 1. BSS2 may use another 10 MHz portion 904 of the 40 MHz spectrum for communications with STAs 4 and 5 in BSS2 and a 20 MHz portion 906 of the 40 MHz spectrum for communications with STA 6 in BSS2.

APs in each of BSS1 and BSS2 may simultaneously transmit/receive to and from their respective STAs on the respective frequency resources. For example, APs in BSS1 may transmit to STAs 1, 2, and 3 at a same time that APs in BSS2 transmit to STAs 4, 5, and 6. APs in BSS1 and BSS2 may use multi-AP DL OFDMA, which generally involves transmissions from multiple APs starting at the same time, to transmit to their STAs. Similarly, STAs 1, 2, and 3 may transmit to APs in BSS1 at a same time that STAs 4, 5, and 6 transmit to APs in BSS2. STAs may use UL OFDMA, which generally involves transmissions from STAs starting at the same time, to transmit to APs.

In this example, STAs 1, 2, and 3 may be multiplexed (e.g., in the spatial domain) using MU-MIMO, and STAs 4-5 may be multiplexed (e.g., in the spatial domain) using MU-MIMO. Further, note that the amount of frequency resources, number of STAs and BSSs in FIG. 9 are provided merely as reference examples, and that any amount of frequency resources may be shared with any number of STAs and BSSs.

Referring back to FIG. 5A, FIG. 5A illustrates an example of sharing spatial stream resources across multiple BSSs (e.g., in the case where DL coordinated beamforming is used for DL distributed MU-MIMO). In this example, two APs (AP1 and AP2) may transmit simultaneously to their respective STAs. As shown, AP1 may use its extra spatial dimensions (represented by dashed lines) to form nulls to the receivers of transmissions in BSS2, e.g., to limit the interference (due to transmissions from AP1) at the receivers in BSS2. Likewise, AP2 may use its extra spatial dimensions (represented by dashed lines) to form nulls to the receivers of transmissions in BSS1, e.g., to limit the interference (due to transmission from AP2) at the receivers in BSS1. FIG. 5B shows a similar example of sharing spatial stream resources across multiple BSSs for UL distributed MU-MIMO.

Aspects presented herein provide techniques and apparatus for enabling a (first) BSS sharing frequency/spatial stream resources with at least another (second) BSS to simultaneously transmit/receive with one or more unused frequency/spatial stream resources in the other BSS. Note that while certain aspects of the present disclosure describe operations performed by a master AP (that is part of a BSS), operations described herein may be performed by another entity that may not be part of a BSS, such as a device acting as a central processing unit, scheduler, or coordinator.

Figure 10:
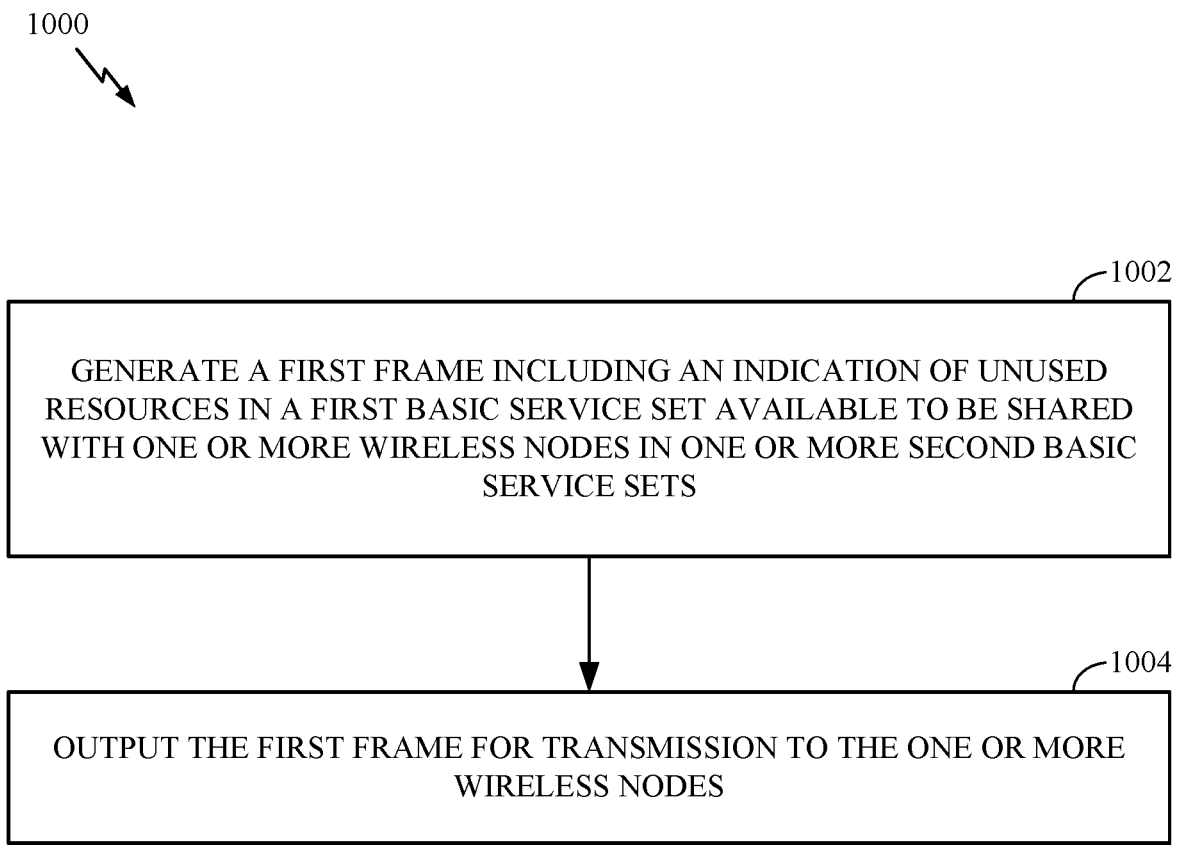
FIG. 10 is a flow diagram of example operations for wireless communication, in accordance with certain aspects of the present disclosure.

FIG. 10 a flow diagram of example operations 1000 for wireless communications by an apparatus, in accordance with aspects of the present disclosure. The operations may be performed by an apparatus such as a master access point (e.g., AP 110) or other entity, such as a central processing unit, scheduler, or coordinator.

Figure 10A:
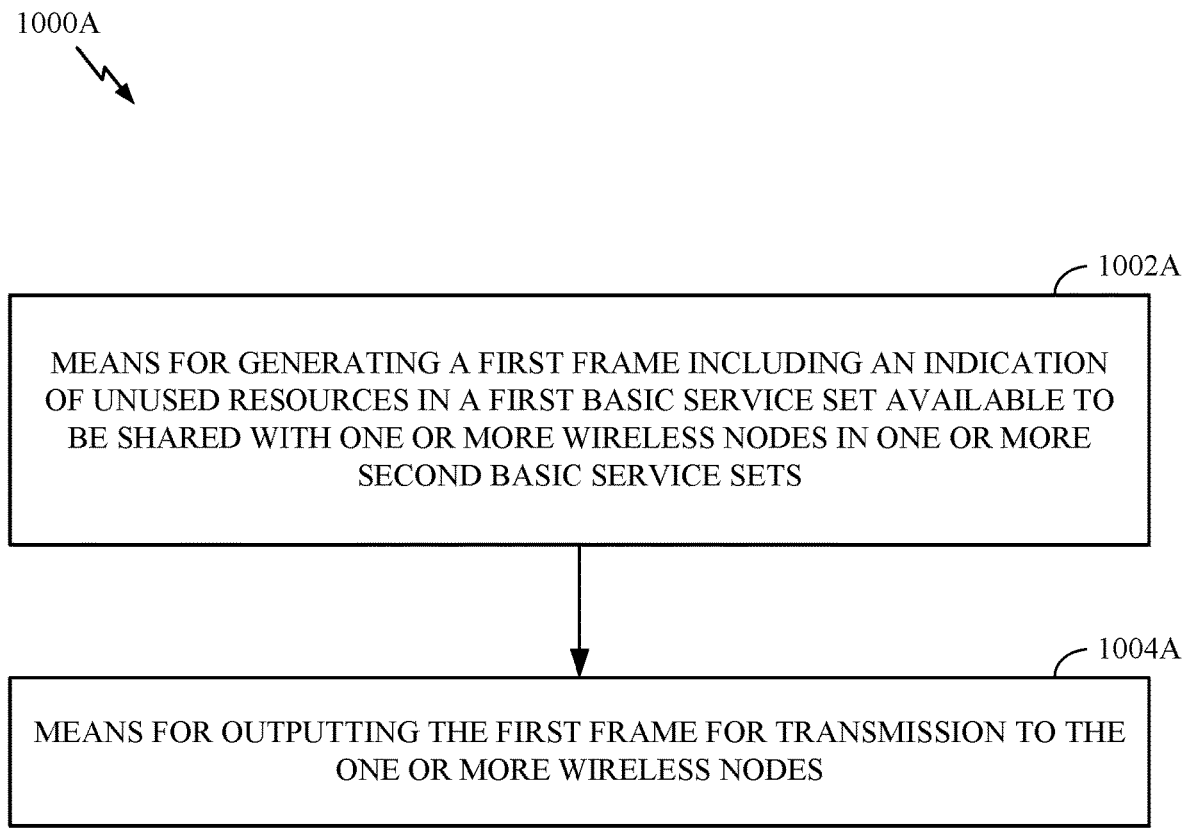
FIG. 10A illustrates example components capable of performing the operations shown in FIG. 10, in accordance with certain aspects of the present disclosure.

Operations 1000 begin, at 1002, where the apparatus generates a first frame including an indication of unused resources in a first basic service set (BSS) available to be shared with one or more wireless nodes (e.g., APs/STAs) in one or more second BSSs. The unused resources may include at least one of unused spatial dimensions available at the apparatus (e.g., assuming the apparatus is in the first BSS), unused spatial dimensions available at another apparatus in the first BSS, or unused portions of spectrum in the first BSS. At 1004, the apparatus outputs the first frame for transmission to the one or more wireless nodes. FIG. 10A illustrates example components (1002A and 1004A) capable of performing the operations shown in FIG. 10.

In some aspects, the operations 1000 may further include obtaining (by the apparatus) a second frame (e.g., "intent to participate" frame) from each of at least some of the one or more wireless nodes indicating an intent to use one or more of the unused resources. The apparatus may determine a group of the one or more wireless nodes to participate in distributed communications with the apparatus based in part on the indication, in each second frame, of the intent to use one or more of the unused resources, and participate in distributed communications with the group of wireless nodes.

Figure 11:
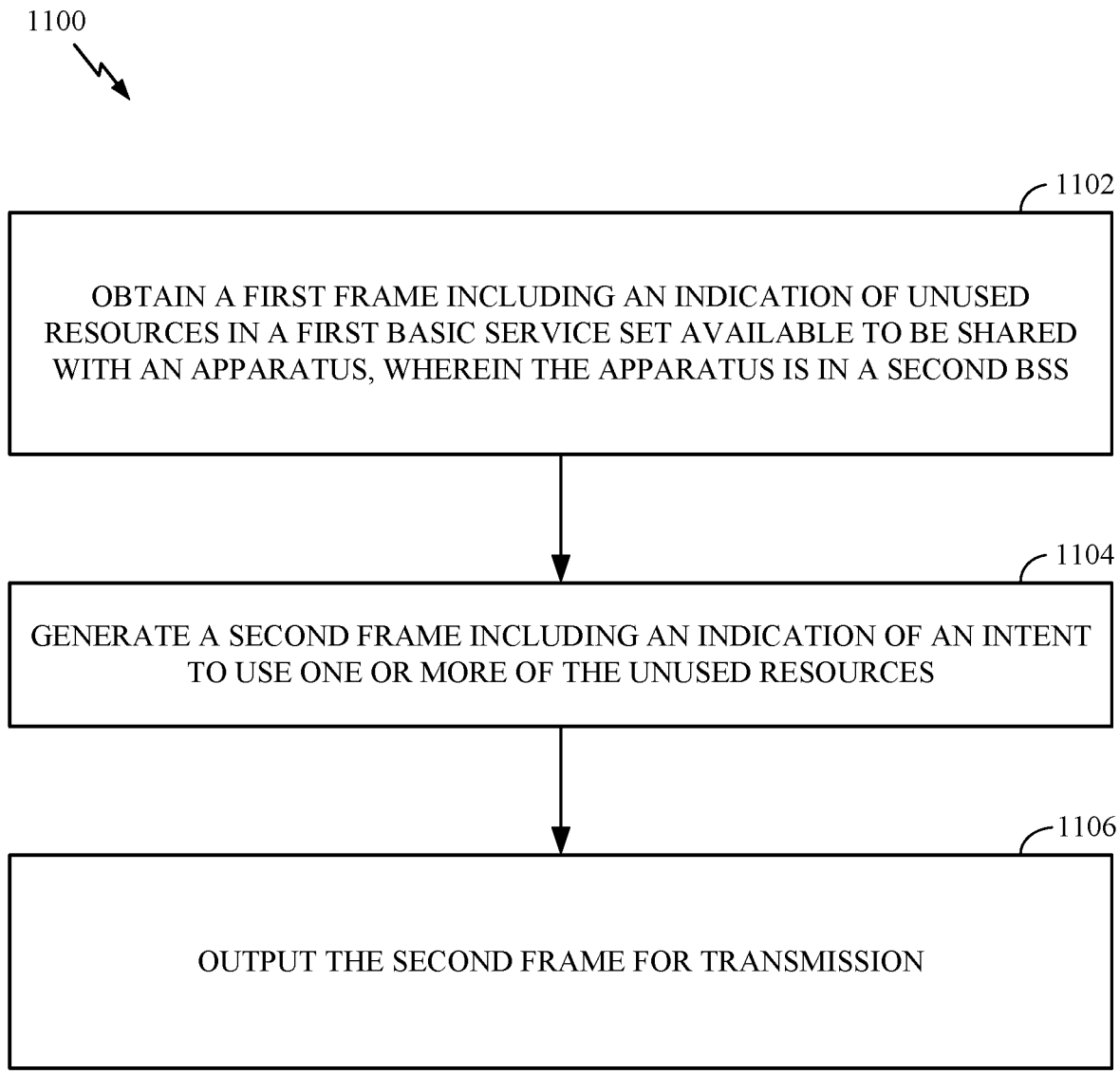
FIG. 11 is a flow diagram of example operations for wireless communication, in accordance with certain aspects of the present disclosure.

FIG. 11 a flow diagram of example operations 1100 for wireless communications by an apparatus, in accordance with aspects of the present disclosure. The operations may be performed by an apparatus such as a slave access point (e.g., AP 110), or STA acting as an AP.

Figure 11A:
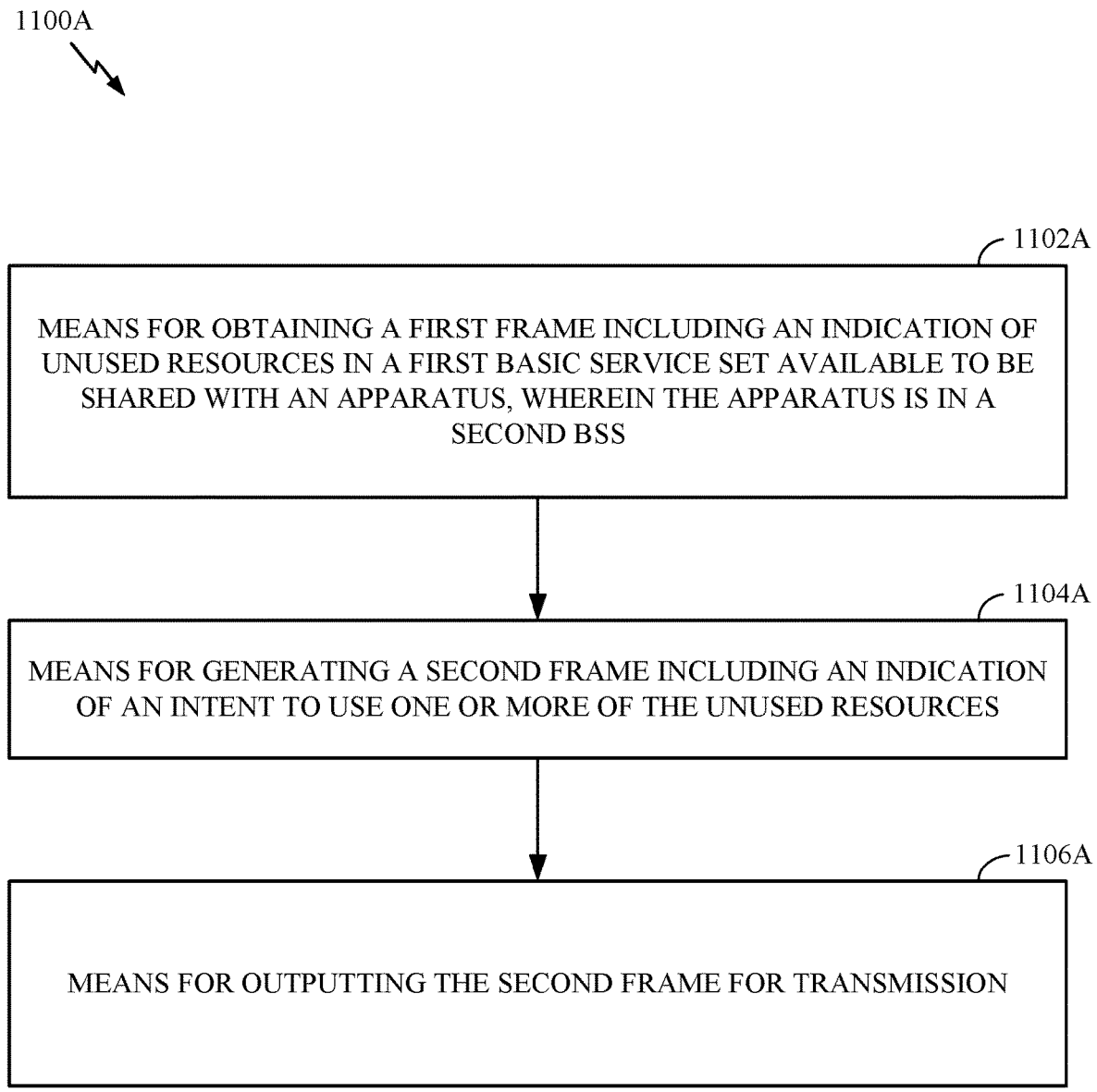
FIG. 11A illustrates example components capable of performing the operations shown in FIG. 11, in accordance with certain aspects of the present disclosure.

Operations 1100 begin, at 1102, where the apparatus obtains a first frame including an indication of unused resources in a first BSS available to be shared with the apparatus, wherein the apparatus is in a second BSS. The unused resources may include at least one of unused spatial dimensions available at another apparatus in the first BSS or unused portions of spectrum in the first BSS. In some aspects, the apparatus may obtain the first frame from the other apparatus (e.g., a master AP) in the first BSS. In some aspects, the apparatus may obtain the first frame from an apparatus that is not located in a BSS, such as a device acting as a central processing unit, scheduler, or coordinator. At 1104, the apparatus generates a second frame including an indication of an intent to use one or more of the unused resources. In some aspects, the second frame may further include an indication of at least one of a number of spatial dimensions available at the apparatus or a number of devices served by the apparatus. At 1106, the apparatus outputs the second frame for transmission. FIG. 11A illustrates example components (1102A, 1104A and 1106A) capable of performing the operations shown in FIG. 11.

In some aspects, operations 1100 may further include generating (by the apparatus) one or more data frames for participating in distributed communications with at least another apparatus in the first BSS, after the second frame is output for transmission, and outputting (by the apparatus) at least one of the data frames using one or more of the unused resources. In some aspects, the apparatus may obtain one or more data frames on the unused resources from one or more devices (e.g., STAs served by the apparatus) in the second BSS. In some aspects, the apparatus may obtain a third (allocation) frame after the second frame is output for transmission that allocates at least one of the unused spatial dimensions or the unused portions of spectrum, and may participate in the distributed communications with the other apparatus based on the allocated unused spatial dimensions or unused portions of spectrum.

Figure 12:
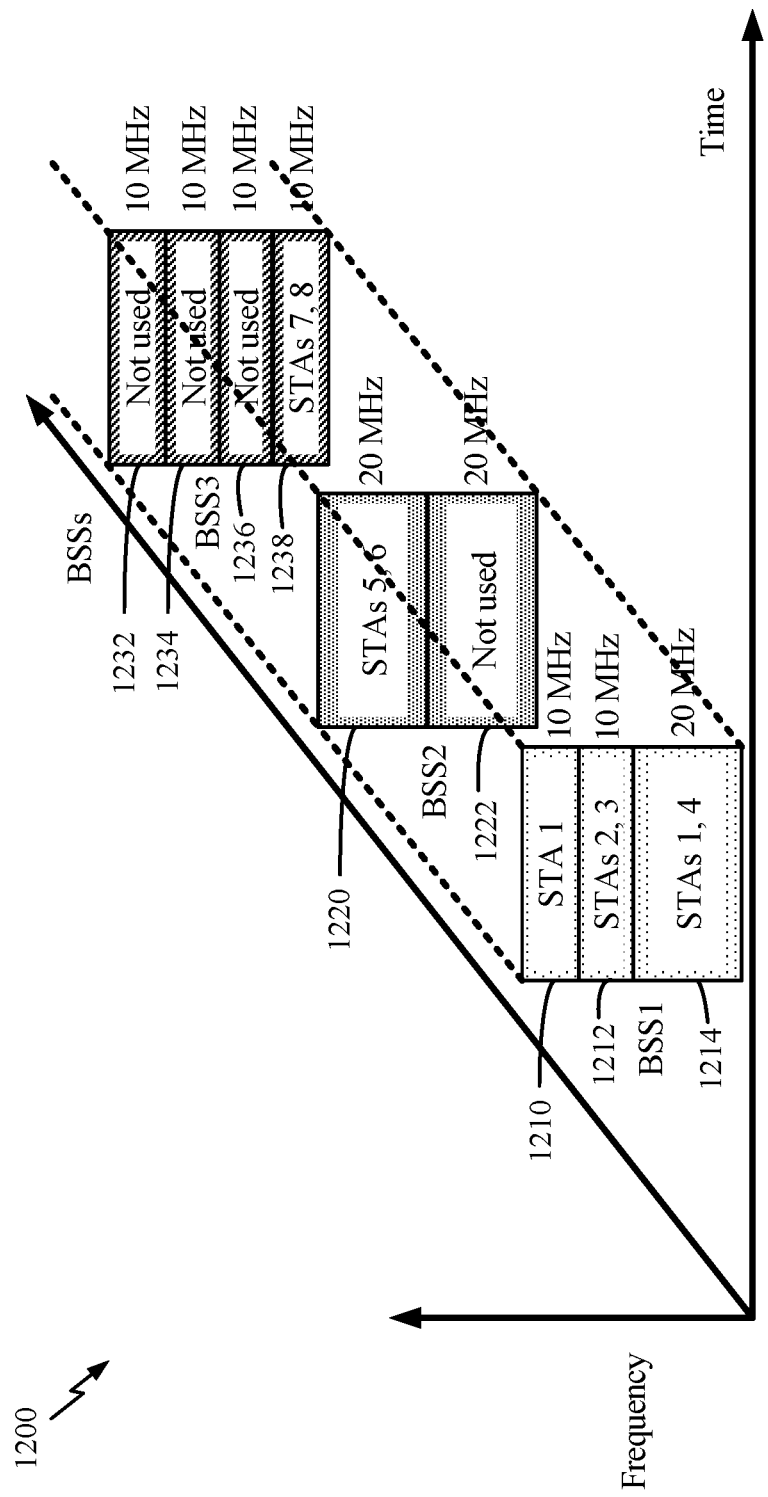
FIG. 12 illustrates an example of sharing frequency and spatial stream resources across multiple BSSs for distributed communications, in accordance with certain aspects of the present disclosure.

FIG. 12 illustrates an example scenario 1200 of frequency and spatial stream sharing across multiple BSSs, in accordance with certain aspects of the present disclosure. Particularly, FIG. 12 shows three BSSs (BSS1, BSS2, BSS3) sharing frequency/spatial stream resources with unused resources in BSS2 and BSS3. BSS1 includes STAs 1-4, BSS2 includes STAs 5-6, and BSS3 includes STAs 7-8. In BSS1, STA 1 is allocated a 10 MHz portion 1210 of spectrum, STAs 2 and 3 are allocated a 10 MHz portion 1212 of spectrum, and STAs 1 and 4 are allocated a 20 MHz portion 1214 of spectrum. In BSS2, STAs 5 and 6 are allocated a 20 MHz portion 1220 of spectrum, and another 20 MHz portion 1222 of spectrum is unused. In BSS3, 10 MHz portions 1232, 1234, and 1236 of spectrum are unused, and STAs 7 and 8 are allocated a 10 MHz portion 1238 of spectrum. Note, however, that the scenario depicted in FIG. 12 is provided merely as a reference example of frequency and spatial stream sharing across multiple BSSs. In general, those of ordinary skill in the art will recognize from the aspects presented herein that any number of various different frequency/spatial stream resources can be shared across BSSs.

As shown, STA 1 (from BSS1) and STAs 5, 6 (from BSS2) may be multiplexed using a form of distributed communications (e.g., MU-MIMO) in overlapping frequencies. For example, in the case of downlink, STAs 1, 5, and 6 may be multiplexed using DL coordinated beamforming and, in the case of uplink, STAs 1, 5, and 6 may be multiplexed using coordinated UL MU-MIMO. In addition, STAs 2 and 3 (from BSS1) and STAs 5 and 6 (from BSS2) may be multiplexed using a form of distributed communications (e.g., DL/UL MU-MIMO) in overlapping frequencies. Similarly, STAs 1 and 4 (from BSS1) and STAs 7 and 8 (from BSS3) may be multiplexed using a form of distributed communications (e.g., DL/UL MU-MIMO) in overlapping frequencies. The portions of spectrum labeled "not used" are unused portions of spectrum. For example, BSS2 has a single 20 MHz unused portion 1222 of 40 MHz spectrum and BSS3 has three 10 MHz unused portions 1232, 1234, and 1236 of 40 MHz spectrum.

Additionally or alternatively, there may be one or more unused spatial dimensions available at the APs/STAs in each BSS. In some cases, the number of unused spatial dimensions available at each device (e.g., AP/STA) can be different in different portions of the spectrum in each BSS. As a reference example, a master AP in BSS1 may have a first number of unused spatial dimensions in the 10 MHz portion 1210 used by STA 1 and a different second number of unused spatial dimensions in the 10 MHz portion 1212 used by STAs 2 and 3.

Each AP serving a group of STAs in a BSS may allocate each STA a portion of spectrum to use for distributed communications. In some cases, a STA may be allocated one or more resource units (e.g., different portions of spectrum and/or spatial streams) within the same BSS. As a reference example, FIG. 12 shows STA 1 being allocated a 10 MHz portion 1210 of 40 MHz spectrum in BSS1 and being multiplexed with STA 4 in a 20 MHz portion 1214 of 40 MHz spectrum in BSS1. In some cases, a given user may be able to participate in a distributed MU-MIMO transmission with a set of OBSS users in one part of the spectrum and the same given user may be able to participate in a distributed MU-MIMO transmission with a different set of OBSS users in another part of the spectrum. As a reference example, FIG. 12 shows STAs 5 and 6 in BSS2 being paired with STA 1 (from BSS1) in one 10 MHz portion 1210 of 40 MHz spectrum and being paired with STAs 2 and 3 (from BSS1) in another 10 MHz portion 1212 of 40 MHz spectrum.

In some cases, a master-slave AP operation may be used to enable distributed communications with unused resources shared across multiple BSSs. For example, the master AP (e.g., the BSS that starts transmission) before a given transmission (e.g., first transmission) may determine that it does not need the entire spectrum and/or that it has empty spatial dimensions in certain portions of the spectrum. Referring to FIG. 9 as a reference example, the AP serving STAs 1, 2, and 3 may be the master AP and the AP serving STAs 4, 5, and 6 may be a slave AP. Once the master AP identifies unused resources in a BSS, the master AP may invite other BSSs to participate in the distributed communications and perform distributed MU communications with one or more of the devices (e.g., APs/STAs) in the other BSSs. The distributed MU communications may include, for example, simultaneous transmissions from each BSS to STAs in the BSS or simultaneous receptions from STAs in each BSS at the BSS.

In some cases, the master AP may perform group formation, sounding and/or synchronization before a distributed communication occurs. In some aspects, the group formation, sounding and/or synchronization may be performed as part of a WiFi protocol. In group formation, the master AP may prepare to transmit and determine a lack of efficient usage of frequency and spatial stream resources. For example, the master AP may detect one or more unused resources in a BSS. The master AP may then send out an invitation to neighboring BSSs (which may involve prioritizing certain APs) to participate in the distributed transmission with at least a portion of the unused resources. Note, however, that group formation may happen as part of other steps (e.g., sounding, synchronization, etc.).

In the sounding and synchronization phase, the master AP may send out synchronization frames (e.g., if slave AP(s) are not already synchronized). For example, in some aspects, the apparatus (as part of operations 1000) may generate one or more synchronization frames for synchronizing with the group of wireless nodes for the distributed communications, and output the synchronization frames for transmission to the group of wireless nodes. The master and slave APs may also collect feedback, if needed, using explicit feedback mechanisms (e.g., FIGS. 6A-6C, 7A-7C) or implicit feedback mechanisms (e.g., FIGS. 8A-8B). In some cases, however, the sounding step may not be needed (e.g., for OFDMA or UL distributed MU).

The final distributed MU transmission may be performed in various different ways. For example, the distributed MU transmission may be distributed OFDMA only or distributed MU-MIMO only or the distributed MU transmission may a mixture of distributed OFDMA and distributed MU-MIMO. In some cases, the distributed MU transmission may include occasional synch messages from the master AP.

Figure 13:
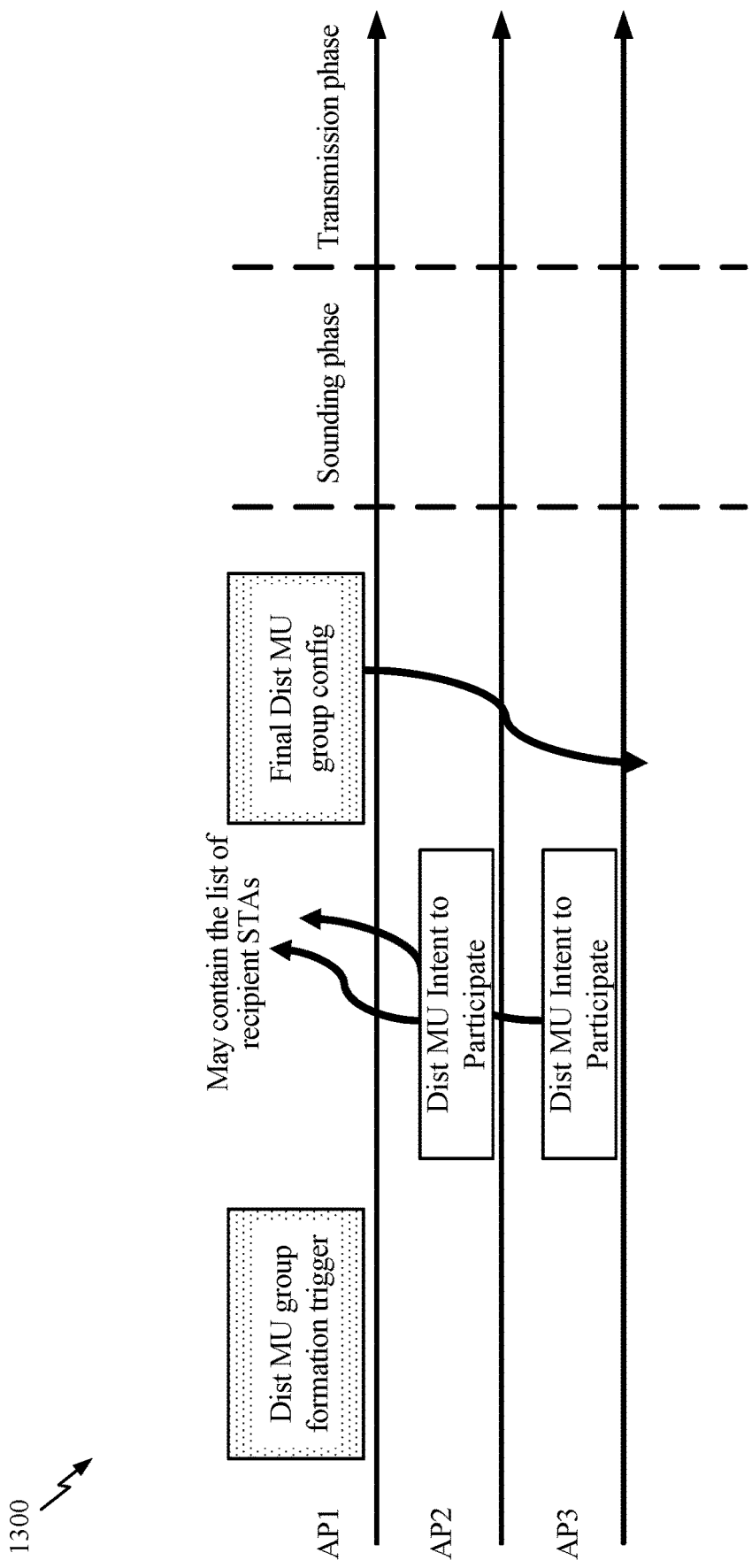
FIG. 13 illustrates a group formation protocol for sharing unused resources for distributed communications, in accordance with certain aspects of the present disclosure.

FIG. 13 illustrates an example group formation protocol 1300 for sharing unused resources for distributed communications, in accordance with certain aspects of the present disclosure. In this example, AP1 is the master AP (of BSS1). AP2 (of BSS2) and AP3 (of BSS3) are slave APs. Group formation may occur via over the air messages or via a backhaul. As shown, AP1 may initiate a group formation procedure by sending a special trigger message (e.g., Distributed (Dist) MU group formation trigger) to neighboring APs (AP2 and AP3).

The Dist MU group formation trigger may indicate whether there are unused resources in BSS1 available to be shared with AP2 and AP3. For example, the Dist MU group formation trigger may include at least one of the number of empty spatial dimensions available at the master AP (e.g., in various resource units of frequency) or the frequency units (e.g., portions of spectrum) that are unused in BSS1.

In response to the Dist MU group formation trigger, each neighboring AP may reply with an intent to use one or more of the unused resources. For example, each neighboring AP may send an "intent to participate" frame (e.g., Dist MU Intent to participate frame) to the master AP. As shown in FIG. 13, for example, AP2 and AP3 both transmit an "intent to participate" frame indicating an intent to use one or more of the unused resources for a distributed communication with the master AP. The "intent to participate" frame may be sent sequentially or simultaneously by each neighboring AP. The "intent to participate" frame may include a list of STAs served by the neighboring AP and/or potential stream allocations (e.g., a number of spatial dimensions available at the neighboring AP) in various frequency resource units. The master AP may use this information to determine the number of nulling dimensions available at the neighboring AP. The "intent to participate" frame may be sent using open loop MU-MIMO (e.g., similar to UL MU-MIMO) or UL OFDMA.

In some cases, based on the "intent to participate" frames, the master AP may respond by allocating one or more of the unused resources to the neighboring APs. For example, the apparatus (as part of operations 1000) may generate, after obtaining the second ("intent to participate") frames, a third frame allocating at least one of the unused resources to the wireless nodes that sent the second frames. In some aspects, if neighboring APs respond with an intent to use more streams and/or frequency resources that can be accommodated, the master AP can drop some APs, reduce the stream/frequency resources per AP, etc. The master AP can update the resource allocation for each AP via an allocation frame. As shown in FIG. 13, for example, the master AP may send an (optional) allocation frame (e.g., "Final Dist MU group config") to allocate the unused resources among the neighboring APs.

To determine the allocation, the master AP may prioritize the requests (e.g., within the "intent to participate" frames) based on one or more criteria. For example, the master AP may determine the allocation based on a number of received "intent to participate" frames, interference conditions, re-use situations, a reciprocal agreement of priority between the master AP and one or more neighboring APs, etc. In some cases, the master AP may send the allocation frame in a different phase of the WiFi protocol. For example, the allocation frame may be combined with an NDPA of the sounding phase or another trigger to start the distributed MU transmission.

In the sounding phase of FIG. 13, the master AP may use any of the above described communication sounding protocols (e.g., FIGS. 6A-6C, 7A-7C and 8A-8B). In some aspects, however, the master AP during the sounding phase may be able to request partial band feedback (e.g., feedback for 10 MHz of a 40 MHz spectrum, or in general, another partial band of a larger spectrum) from each STA.

For DL or UL distributed MU transmissions, synchronization among APs may be similar to synchronization performed for inter-STAs for UL OFDMA. That is, the synchronization requirements may be no worse than the synchronization requirements for UL OFDMA. To improve synchronization, the master AP can send a trigger before the distributed communications.

In the case of a multi-AP or multi-STA NDP, there may be one or more implications for tracking during LTFs for NDP. For example, in the absence of complete synchronization across all transmitters, multiple local oscillators (LOs) may have to potentially be tracked. This scenario may be different from other cases (e.g., 11ac/11ax DL MU-MIMO) where a single LO is tracked. In some cases, tracking multiple LOs may use techniques similar to those in UL MU-MIMO (e.g., in flax) where multiple STAs transmit to one AP at the same time.

In some cases, if different APs are FDM'd in frequency, phase tracking per transmitter may become easier (e.g., just have pilots for different APs on non-overlapping tones). If different transmitters are TDM'd in time, phase tracking per transmitter may still be possible. However, it may be beneficial to interleave the symbols of one transmitter rather than have consecutive symbols belonging to one AP. If a P-matrix is used, then there may be multiple options for tracking. In one option, multi-stream pilots can be used. In another option, non-overlapping pilot tones can be given to different transmitters. In the case of multi-stream pilots, there may be one stream per AP on pilot tones or the number of streams per AP on pilot tones may be equal to the number of streams given to that transmitter in the LTF section.

There may also be multiple options for pilots during data. In a first option, there may be one stream per transmitter on the pilot tones. In a second option, the number of streams per transmitter on pilot tones may be same as the data tones allocated to it. In a third option, non-overlapping pilot tones may be given to different transmitters. For example, there may be one stream for each transmitter on the allocated pilot tones or a same number of streams for each transmitter as its data tones.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000 and 1100 illustrated in FIGS. 10 and 11 correspond to means 1000A and 1100A illustrated in FIGS. 10A and 11A, respectively.

For example, means for transmitting, means for sending, and/or means for indicating may comprise a transmitter (e.g., the transmitter unit 222) and/or an antenna(s) 224 of the access point 110, a transmitter (e.g., the transmitter unit 254) and/or antenna(s) 252 of the user terminal 120 illustrated in FIG. 2, or the (transmitter 310 of) transceiver 314 of the wireless device 302 illustrated in FIG. 3. Means for receiving may comprise a receiver (e.g., the receiver unit 222) and/or an antenna(s) 224 of the access point 110, a receiver (e.g., the receiver unit 254) and/or antenna(s) 252 of the user terminal 120 illustrated in FIG. 2, or the (receiver 312 of) transceiver 314 of the wireless device 302 illustrated in FIG. 3.

Means for processing, means for generating, means for sharing, means for selecting, means for performing, means for decoding, means for using, means for participating, means for synchronizing, means for indicating, means for deciding, means for allocating, and/or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2, or the processor 304 of the wireless device 302 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication performed by an apparatus, the method comprising:
   identifying a set of unused resources in a first basic service set (BSS);
   determining a group of one or more wireless nodes in a second BSS to participate in distributed communications with the apparatus;
   allocating at least a portion of the set of unused resources to the group of the one or more wireless nodes; and
   participating in distributed communications with the group of the one or more wireless nodes with at least the portion of the set of unused resources.

2. The method of claim 1, further comprising participating in a group formation procedure with the one or more wireless nodes in the second BSS.

3. The method of claim 2, wherein the group of the one or more wireless nodes is determined based on the group formation procedure.

4. The method of claim 2, wherein the group of the one or more wireless nodes comprises a subset of a plurality of wireless nodes in the second BSS.

5. The method of claim 2, wherein participating in the group formation procedure comprises initiating the group formation procedure with the one or more wireless nodes.

6. The method of claim 5, wherein initiating the group formation procedure comprises transmitting to the one or more wireless nodes a message including an indication of the set of unused resources in the first BSS.

7. The method of claim 1, wherein the set of unused resources comprise unused spatial dimensions available at the apparatus.

8. The method of claim 7, wherein the unused spatial dimensions available at the apparatus comprise:
   a first number of the unused spatial dimensions available at the apparatus in a first portion of spectrum in the first BSS; and
   a second number of the unused spatial dimensions available at the apparatus in a second portion of spectrum in the first BSS.

9. The method of claim 1, wherein the set of unused resources comprise unused portions of spectrum in the first BSS.

10. An apparatus comprising:
    at least one processor configured to:
      identify a set of unused resources in a first basic service set (BSS);
      determine a group of one or more wireless nodes in a second BSS to participate in distributed communications with the apparatus;
      allocate at least a portion of the set of unused resources to the group of the one or more wireless nodes; and
      participate in distributed communications with the group of the one or more wireless nodes with at least the portion of the set of unused resources; and
    a memory coupled to the at least one processor.

11. The apparatus of claim 10, wherein the at least one processor is further configured to participate in a group formation procedure with the one or more wireless nodes in the second BSS.

12. The apparatus of claim 11, wherein the group of the one or more wireless nodes is determined based on the group formation procedure.

13. The apparatus of claim 11, wherein the group of the one or more wireless nodes comprises a subset of a plurality of wireless nodes in the second BSS.

14. The apparatus of claim 11, wherein the at least one processor is configured to participate in the group formation procedure by initiating the group formation procedure with the one or more wireless nodes.

15. The apparatus of claim 14, wherein the at least one processor is configured to initiate the group formation procedure by generating a message including an indication of the set of unused resources in the first BSS, the apparatus further comprising a transmitter configured to transmit the message to the one or more wireless nodes.

16. The apparatus of claim 10, wherein the set of unused resources comprise unused spatial dimensions available at the apparatus.

17. The apparatus of claim 16, wherein the unused spatial dimensions available at the apparatus comprise:
    a first number of the unused spatial dimensions available at the apparatus in a first portion of spectrum in the first BSS; and
    a second number of the unused spatial dimensions available at the apparatus in a second portion of spectrum in the first BSS.

18. The apparatus of claim 10, wherein the set of unused resources comprise unused portions of spectrum in the first BSS.

19. A non-transitory computer-readable medium comprising processor-executable instructions to cause one or more processors to:
    identify a set of unused resources in a first basic service set (BSS);
    determine a group of one or more wireless nodes in a second BSS to participate in distributed communications;
    allocate at least a portion of the set of unused resources to the group of the one or more wireless nodes; and
    participate in distributed communications with the group of the one or more wireless nodes with at least the portion of the set of unused resources.

20. The non-transitory computer-readable medium of claim 19, wherein the one or more processors are further configured to participate in a group formation procedure with the one or more wireless nodes in the second BSS.

21. The non-transitory computer-readable medium of claim 20, wherein the one or more processors are configured to participate in the group formation procedure by initiating the group formation procedure with the one or more wireless nodes.

22. The non-transitory computer-readable medium of claim 19, wherein the set of unused resources comprise unused spatial dimensions available at the apparatus.

23. The non-transitory computer-readable medium of claim 19, wherein the set of unused resources comprise unused portions of spectrum in the first BSS.

24. An apparatus for wireless communications, comprising:
    means for identifying a set of unused resources in a first basic service set (BSS);
    means for determining a group of one or more wireless nodes in a second BSS to participate in distributed communications with the apparatus;
    means for allocating at least a portion of the set of unused resources to the group of the one or more wireless nodes; and
    means for participating in distributed communications with the group of the one or more wireless nodes with at least the portion of the set of unused resources.

25. The apparatus of claim 24, further comprising:
means for participating in a group formation procedure with the one or more wireless nodes in the second BSS.

26. The apparatus of claim 25, further comprising:
means for initiating the group formation procedure with the one or more wireless nodes.

27. The apparatus of claim 26, further comprising:
means for generating a message including an indication of the set of unused resources in the first BSS.

28. The apparatus of claim 24, wherein the set of unused resources comprise unused spatial dimensions available at the apparatus.

29. The apparatus of claim 24, wherein the set of unused resources comprise unused portions of spectrum in the first BSS.

* * * * *